(12) United States Patent
Panambur et al.

(10) Patent No.: US 9,536,388 B2
(45) Date of Patent: Jan. 3, 2017

(54) GAMING CHIP HAVING CAPACITIVE COUPLING AND RELATED METHODS

(71) Applicant: Bally Gaming, Inc., Las Vegas, NV (US)

(72) Inventors: Karthik Shenoy Panambur, Bangalore (IN); Yogendrasinh Hematji Rajput, Bangalore (IN); Prateek Kumar Baishkhiyar, Jharkhand (IN); Ravi Subramanian, Bangalore (IN)

(73) Assignee: BALLY GAMING, INC., Las Vegas, NV (US)

( * ) Notice: Subject to any disclaimer, the term of this patent is extended or adjusted under 35 U.S.C. 154(b) by 274 days.

(21) Appl. No.: 14/499,018

(22) Filed: Sep. 26, 2014

(65) Prior Publication Data
US 2016/0093165 A1    Mar. 31, 2016

(51) Int. Cl.
*G06F 17/00* (2006.01)
*G06F 19/00* (2011.01)
*G07F 17/32* (2006.01)
*G06K 19/04* (2006.01)

(52) U.S. Cl.
CPC ......... *G07F 17/3248* (2013.01); *G06K 19/047* (2013.01); *G07F 17/32* (2013.01); *G07F 17/322* (2013.01); *G07F 17/3241* (2013.01); *G07F 17/3251* (2013.01)

(58) Field of Classification Search
CPC .... G06F 17/32; G06F 17/3251; G06F 17/322; G06F 17/3232; G06F 17/3239; G06F 17/3241; G06F 17/3248; G06F 1/06; G06K 19/047; G06K 19/07749
See application file for complete search history.

(56) References Cited

U.S. PATENT DOCUMENTS

| | | | | |
|---|---|---|---|---|
| 5,166,502 A | * | 11/1992 | Rendleman | A44C 21/00 235/492 |
| 5,651,548 A | * | 7/1997 | French | A63F 3/00157 273/237 |
| 5,895,321 A | * | 4/1999 | Gassies | A44C 21/00 273/148 R |
| 5,919,090 A | * | 7/1999 | Mothwurf | G07D 9/06 463/11 |

(Continued)

FOREIGN PATENT DOCUMENTS

WO    WO2010114576    10/2010

*Primary Examiner* — Milap Shah
(74) *Attorney, Agent, or Firm* — Seed IP Law Group LLP

(57) ABSTRACT

A system is disclosed for identifying and reading gaming tokens. The system includes: a plurality of gaming tokens; a playing surface including a network of conductors disposed to make electrical contact with the conductive rims of the gaming tokens; one or more transceivers disposed under the playing surface and associated with areas where the gaming tokens are placed on the playing surface; and an identification processor in communication with the transceiver to determine the denomination of the token from the data. Each transceiver is configured to transmit an electromagnetic interrogation signal to the conductive layer of a gaming token resting on the playing surface. The grounded circuit, in response to the interrogation signal, responds with data to identify the chip denomination through capacitive coupling between the conductive layer and a transceiver.

15 Claims, 27 Drawing Sheets

(56) References Cited

U.S. PATENT DOCUMENTS

| | | | | |
|---|---|---|---|---|
| 6,200,218 | B1* | 3/2001 | Lindsay | G07F 17/32 273/148 R |
| 6,264,109 | B1* | 7/2001 | Chapet | A44C 21/00 235/487 |
| 6,296,190 | B1* | 10/2001 | Rendleman | G06K 19/041 235/487 |
| 6,299,534 | B1* | 10/2001 | Breeding | A63F 3/081 273/274 |
| 6,514,140 | B1* | 2/2003 | Storch | G07F 1/06 463/13 |
| 6,629,591 | B1* | 10/2003 | Griswold | G07F 1/06 194/205 |
| 7,575,234 | B2* | 8/2009 | Soltys | A63F 1/18 273/149 R |
| 7,612,675 | B2* | 11/2009 | Miller | |
| 8,353,759 | B2* | 1/2013 | Thorson | G07F 17/32 463/25 |
| 8,576,078 | B2 | 11/2013 | Stewart | |
| 2004/0229682 | A1* | 11/2004 | Gelinotte | G06K 7/0008 463/25 |
| 2006/0019739 | A1* | 1/2006 | Soltys | G07F 17/32 463/25 |
| 2006/0223639 | A1* | 10/2006 | Koyama | G07F 1/06 463/47 |
| 2007/0035399 | A1* | 2/2007 | Hecht | G07F 17/322 340/572.1 |
| 2007/0060311 | A1 | 3/2007 | Rowe et al. | |
| 2007/0197299 | A1* | 8/2007 | Miller | A44C 21/00 463/43 |
| 2007/0225064 | A1* | 9/2007 | Gregoire | G07F 17/3251 463/25 |
| 2007/0293303 | A1* | 12/2007 | Shayesteh | G07F 17/32 463/25 |
| 2008/0009339 | A1* | 1/2008 | Pat | |
| 2008/0076536 | A1* | 3/2008 | Shayesteh | G07D 7/0093 463/25 |
| 2008/0214312 | A1* | 9/2008 | Richard | G07F 1/06 463/47 |
| 2008/0234052 | A1* | 9/2008 | Steil | G07F 1/06 463/47 |
| 2009/0042642 | A1* | 2/2009 | Nissen | G07F 17/3251 463/25 |
| 2009/0075723 | A1* | 3/2009 | Richard | G06M 11/00 463/25 |
| 2009/0075725 | A1* | 3/2009 | Koyama | G06Q 20/3415 463/25 |
| 2009/0221364 | A1* | 9/2009 | Richard | A44C 21/00 463/29 |
| 2010/0093428 | A1* | 4/2010 | Mattice | G07F 17/3251 463/25 |
| 2010/0093429 | A1* | 4/2010 | Mattice | G07F 1/06 463/25 |
| 2014/0015648 | A1 | 1/2014 | Murdoch et al. | |
| 2015/0231487 | A1* | 8/2015 | Richter | A63F 9/0468 463/22 |

* cited by examiner

FIG. 4
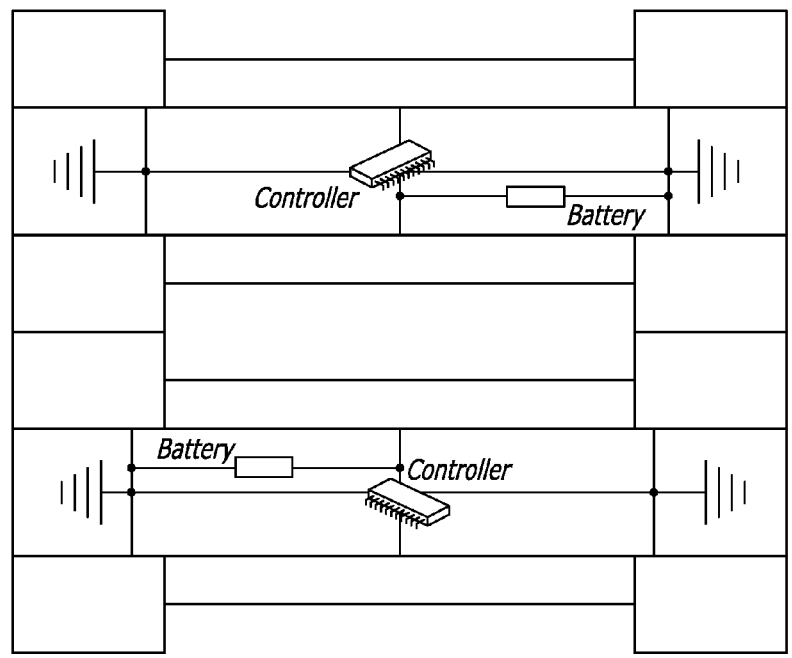
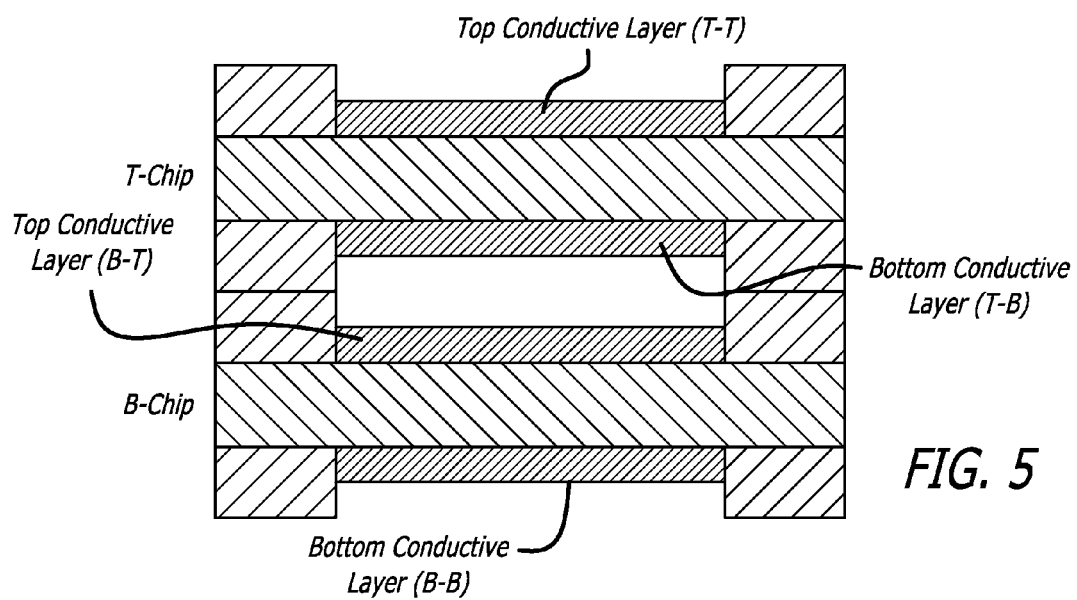
FIG. 5

GAMING CHIP HAVING CAPACITIVE COUPLING AND RELATED METHODS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

This disclosure relates to systems and methods which can determine at least the denomination of a token resting on a surface and, more specifically, systems and methods which can determine properties of a gaming token resting on a gaming table.

BACKGROUND

Gaming tokens are well known. Tokens are used in gaming in lieu of cash and usually represent different token denominations. Typically, tokens appear as molded plastic cylindrical discs (or plastic cylindrical discs) with metallic cores or are rectangular tiles and have different color combinations to distinguish denomination value. The disc shaped tokens are often referred to as chips or checks. In many casinos, these chips are of solid colors but in others establishments, these chips are of different basic colors and have radial bands of a distinguishing color which can be seen when viewing the circular face of the chip as well as when viewing the perimeter of the chip. Thus, when the chips are stacked on a playing table surface or in a chip tray, the different denominations of the chips can be visually distinguished. Distinguishing between the denominations of the chips is important since each chip represents its stated value and can be exchanged for currency. In casinos in the United States, these chips typically have distinguishing colors representing at least the following denominations: $1, $5, $25, $100, and $500.

A drawback to using such molded tokens is that manual counting is required, which can introduce a human error element into the count. Routinely, floor personnel walk to each gaming table to count the chips in the chip trays. They must, through observation of the number of stacks of a known number of chips of the same denomination, make this determination without significantly interrupting play. It would be useful to obtain accurate chip counts without relying upon the expertise of floor personnel to assemble and count the chip stacks.

Regarding fraud considerations, it has been known for players to "past post," which means surreptitiously increasing their wager by adding chips after the result is known. It would be useful if there were a system or method adapted to detect this type of cheating. Other fraud considerations include the counterfeiting of chips. It would also be useful to prevent the use of counterfeit chips.

Additionally, casinos like to track the game play of their players for the purposes of rating the player's worth to the casino. Thus, player tracking systems have been developed. For table game players to gain a rating, floor personnel typically watch the play of the table game players over time. The floor personnel then estimate the time the player spends at the game and the average wager of the player for game hand based upon a known, estimated, measured, or calculated rate of hand play. Using this information, the floor personnel can estimate how much the player will likely lose to the casino. This amount (along with the total amounts wagered) can be used in determining the worth of the player to the casino. The player can be reward in "comps" (rewards in meals, gifts, cash back and the like), which may be provided to the player based upon these determinations to instill player loyalty.

It would be useful if the table game rating process could be more reliable and less dependent on the skill of the floor personnel to make the process more accurate and consistent. Over-compensating the player is a loss to the casino. Under-compensating the player frustrates the purpose for the program.

It would also be useful if casino and other gaming establishments could distinguish between their issued chips and chips from other casinos gaming establishments. Accepting another casino's chips typically results in the inconvenience of having to present these chips for exchange.

Additionally, it would be useful for inventory purposes if the chip amounts in circulation were able to be accurately determined. By determining how many chip are on hand and how many chip are in play, the number of the chips that have been lost or kept by players as souvenirs may be calculated.

SUMMARY

Briefly, and in general terms, disclosed herein is a system for identifying and reading electronic gaming tokens. The system includes: a plurality of gaming tokens; a playing surface including a network of conductors disposed to make electrical contact with the conductive rims of the gaming tokens; one or more transceivers disposed under the playing surface and associated with areas where the gaming tokens are placed on the playing surface; and an identification processor in communication with the transceiver to determine the denomination of the token from the data. Each transceiver is configured to transmit an electromagnetic interrogation signal to the conductive layer of a gaming token resting on the playing surface. The grounded circuit, in response to the interrogation signal, responds with data to identify the chip denomination through capacitive coupling between the conductive layer and a transceiver.

In one embodiment, each electronic gaming token includes: a substrate having a first face, a second face, and a perimeter; a circuit including a power source, token processor, and token memory disposed in the substrate, the memory configured to store data that identifies at least a denomination of the gaming token; first and second conductive layers disposed on the first and second faces respectively, and a conductive rim at the perimeter.

In another embodiment, a method for tracking gaming tokens used by a player for the play of a game having a playing surface is disclosed. The method includes: providing a set of gaming tokens each including, (i) a substrate having a first face, a second face, and a perimeter; (ii) a circuit including a power source, a token processor, and a token memory disposed in the substrate, the memory configured to store data that identifies at least a denomination of the gaming token, (iii) first and second conductive layers disposed on the first and second faces, respectively, and (iv) a conductive rim at the perimeter; configuring the playing surface to include conductors that create a capacitive coupling with a token face conductive layer resting on the playing surface; and equipping the playing surface with a transceiver for issuing an interrogation signal to the playing surface conductors, the interrogation signal passing through capacitive coupling to the token face conductive layer resting on the playing surface and the token processor, the processor responding with a data signal to the transceiver through the capacitive coupling.

The disclosed embodiments further relates to machine readable media on which are stored embodiments of the disclosed invention described in herein. It is contemplated that any media suitable for retrieving instructions is within the scope of the disclosed embodiments. By way of example, such media may take the form of magnetic, optical, or semiconductor media. The invention also relates to data structures that contain embodiments of the disclosed invention, and to the transmission of data structures containing embodiments of the disclosed invention.

Further advantages of the disclosed embodiments will be brought out in the following portions of the specification, wherein the detailed description is for the purpose of fully disclosing the various embodiments without placing limitations thereon.

BRIEF DESCRIPTION OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

FIG. 4 illustrates E-Chip circuitry.

FIG. 5 illustrates the Communication between E-chips.

DETAILED DESCRIPTION

Figure 1A:
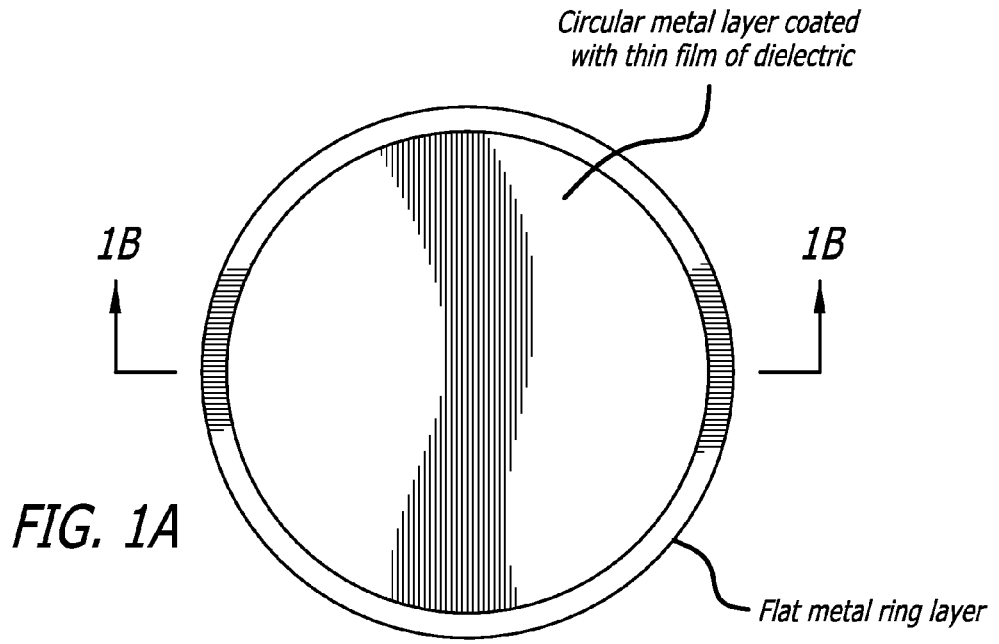
FIG. 1A illustrates a top view of the basic components of the E-Chip.
Figure 1B:
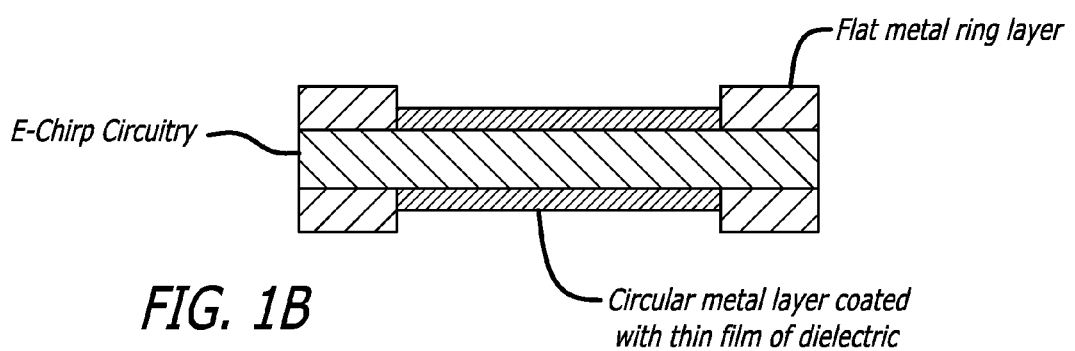
FIG. 1B illustrates a cross-sectional side view of the basic components of the E-Chip.

Persons of ordinary skill in the art will understand that the present disclosure is illustrative only and not in any way limiting. Other embodiments of the presently disclosed system and method readily suggest themselves to such skilled persons having the benefit of this disclosure.

Each of the features and teachings disclosed herein can be utilized separately or in conjunction with other features and teachings to provide a system and method to provide user-configurable rules for team play on a single gaming machine. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "configuring," "determining," "displaying," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIGS. 1A-29 illustrate various embodiments of the disclosed systems and methods which can determine at least the denomination of a token (e.g., electronic chip or E-chip) resting on a surface using capacitive coupling. Also disclosed are systems and methods for systems and methods that may determine additional properties of an E-chip resting on a surface of a gaming table using capacitive coupling.

One of the technologies used by casino chip manufacturers to address the issue of counterfeit chips in table game operations is RFID technology. Typically, an RFID chip contains an RFID tag embedded inside the chip. The RFID tag usually contains the ID of the chip and may include other pertinent data. These are usually passive RFID tags containing a radio device that broadcast the serial number when brought close to a RFID reader. With the help of RFID tags and readers, systems in the casino identify genuine chips and fake chips.

One of the common issues that occurs with use of RFID chips in casino is that the ambient RF (Radio Frequency) noise caused by mobile phones, displays, fluorescent lights, and other electronic equipment, as well as the presence of RF reflector (e.g., metal objects near to the reader) results in problems with the RFID technology. These problems may manifest themselves by impacting the RFID reader performance and accuracy of chips detection in a specific bet area.

Disclosed herein are systems and methods of using E-chips that employ capacitive coupling (as an alternative to the RFID based chips). In some embodiments, the E-chip capacitive coupling system and method communicates to the reader using capacitive coupling to enable peer-to-peer communication between E-chips and to the gaming table.

In some embodiment, the E-chip capacitive coupling system and method enables the use of E-Chips that have IDs, follow definite communication protocol, and implement physical design that are very difficult to duplicated. In another aspect of some embodiments, E-Chips are associated with a particular player or players. Additionally, the E-chip capacitive coupling system and method greatly enhances inventory management of the E-Chips. Continuing, the E-chip capacitive coupling system and method may increase the game speed, since chips do not need to be manual counted, which can be a time consuming and cumbersome process. Moreover, the E-chip capacitive coupling system and method can detect various kinds of fraud from players.

In some embodiments of the E-chip capacitive coupling system and method, the components of the E-Chip system include: (1) the E-Chips themselves, which contain internal electronic circuitry; (2) the clothing on the gaming table (e.g., a layered clothing is using with the E-Chip system); (3) a transceiver at the bottom of the table which communicates with the chip stack; a table system that receives information from the transceivers; (4) a central chip tracking and inventory system; and (5) integrated with peripheral systems such as sorters, dispensers, faulty chip detectors etc.

Referring now to the E-Chip itself of the E-chip capacitive coupling system and method, in one embodiment the basic components of the E-Chip include an embedded microcontroller with data and program memory, as well as a lightweight ultra-thin battery that supplies power to the microcontroller. The top and bottom portions of the chip include: (1) a flat circular conductive layers made of copper or any other conductive material, (2) a flat circular insulating layer on top of the conductive layer, and (3) a flat ring shaped conductive layer that runs around the periphery of the chip.

Continuing, in some embodiments of the E-chip capacitive coupling system and method, the embedded microcontroller may be an 8-bit microcontroller, such as ATMEL's ATtiny85. This microcontroller has the following components: (1) an 8K Bytes of In-System programmable flash memory which can contain program and constant data (which are used for storing program memory, casino specific data, and chip specific data, which are typically one time programmed or re-programmed in a secure manner), and (2) a 512 Bytes of Internal RAM (which are used for storing Player ID).

In one embodiment of the E-chip capacitive coupling system and method, the E-Chip is programmed with casino related information such as a Casino ID, Casino Code, and Secret Encryption code. This information may be one-time programmable or optionally re-programmable in a secure manner. In another aspect, the E-Chip is programmed with chip related information such as Chip ID and Chip Denomination. This information may also be one-time programmable or optionally or re-programmable in a secure manner. Notably, the E-chip capacitive coupling system and method includes chip duplication prevention security measures for re-programmability. In another aspect of the E-chip capacitive coupling system and method, the E-chip stores information related to a specific player (Player ID) to whom chips has been issued by casino. In still another aspect, the E-chip may communicate with other chips (Inter-chip communication) in the chip stack using capacitive coupling. Continuing, in yet another aspect, the E-chip may communicate with the gaming table (table to chip communication and vice versa) using capacitive coupling.

Figure 2:
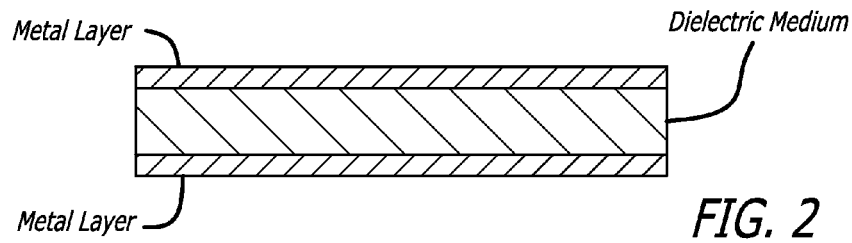
FIG. 2 illustrates a Parallel Plate Capacitor.

Capacitive Coupling:

Referring now to FIG. 2, capacitive coupling occurs between two parallel conductive plates separated by a dielectric medium. When a high frequency signal applied to one of the conductive plates, energy is transferred to second plate. The energy transferred depends on (1) the frequency of the signal applied to the first plate, (2) the distance between the two plates, (3) the area of overlap of the plates, and the permittivity of the dielectric medium (dielectric constant).

Figure 3:
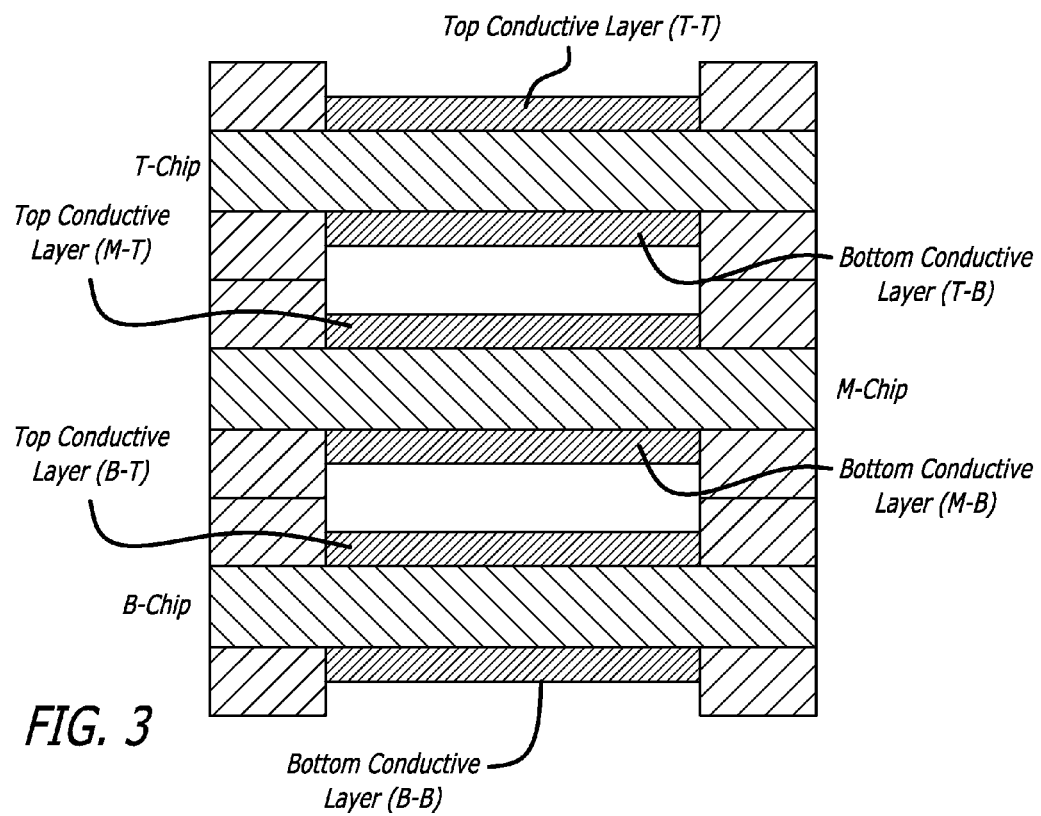
FIG. 3 illustrates a Capacitive Coupling in E-chip.

Referring now to FIG. 3, the application of capacitive coupling in the E-chip capacitive coupling system and method is shown. Three E-Chips are placed as a stack, where the E-Chips are called T(top), M(Middle), and B(Bottom). Each E-Chip has two conductive layers, one on top and the other one at the bottom. A parallel plate capacitor is formed between the top layer of the M chip and the bottom layer of the T chip. When a high frequency signal is applied to the bottom plate (i.e., the top layer of Chip M) energy gets transferred to the top plate (i.e., the bottom layer of T chip). Additionally, a parallel plate capacitor is formed between the bottom layer of the M chip and the top layer of the B chip. When a high frequency signal is applied to the bottom plate (top layer of Chip B) energy gets transferred to the top plate (bottom layer of M chip). Data communication may be achieved between the chips by applying high frequency signal to the top or the bottom layers of the chips.

Referring now to FIG. 4, the circuitry of an E-Chip in one embodiment of the E-chip capacitive coupling system and method is shown. In one embodiment, the microcontroller has two I/O pins connected to the top and bottom circular conductive layers. These I/O pins carry high frequency signals (containing communication data) necessary for capacitive coupling (which are highlighted by green colored lines in FIG. 4). Continuing, in one embodiment, an ultra-thin battery supplies power to the microcontroller (which is highlighted by a red colored line in FIG. 4). A battery is used with minimum leakage current. Grounding is provided to the battery and the microcontroller by the flat conductive ring at the periphery of the chip. The ground pins highlighted by Black colored line in FIG. 4.

Figure 6A:
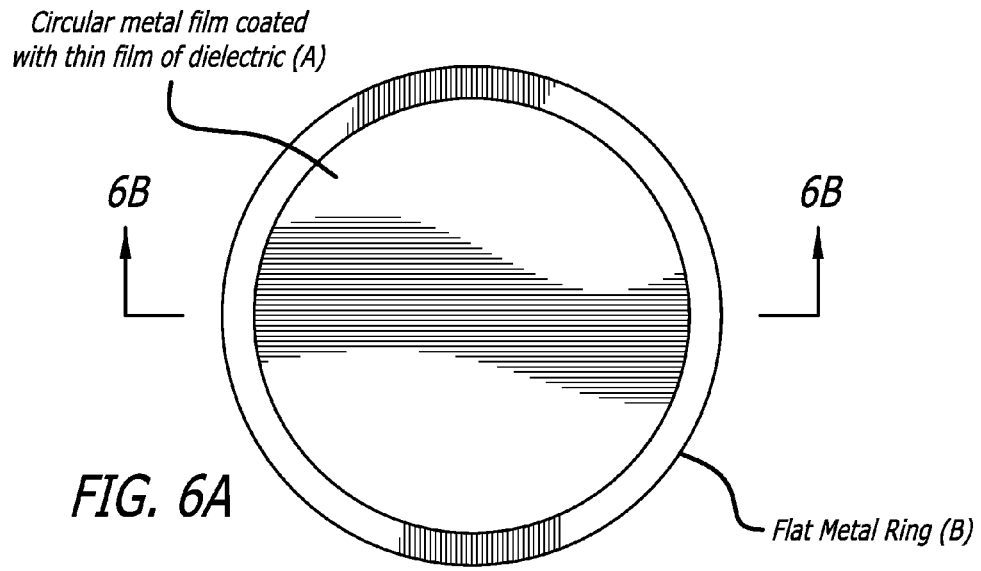
FIG. 6A illustrates a top view of the E-Chip.
Figure 6B:
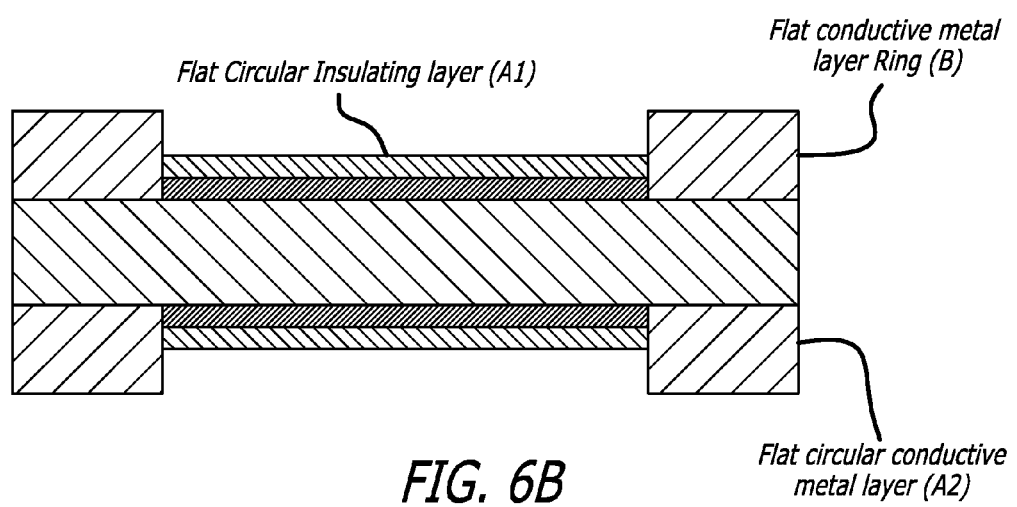
FIG. 6B illustrates a cross-sectional side view of the E-Chip.

Referring still to FIG. 4, as well as FIGS. 6A and 6B, the components of an E-Chip in one embodiment of the E-chip capacitive coupling system and method are shown. In one embodiment, the microcontroller (marked as "Controller" in FIG. 4) is an embedded microcontroller, typically an 8-bit ultra-low power microcontroller. A microcontroller is selected that consumes ultra-low power in sleep mode (typically 0.1 UA) and has small wake-up time on receiving an interrupt. In one aspect, the controller uses its internal clock as this avoids the use of external oscillator which adds to the size and cost. In another aspect, the controller is driven at its lowest clock speeds to keep the power consumption in active mode least. In still another aspect, the controller mainly performs I/O operation during its active mode. It also performs data processing tasks when necessary.

In one embodiment of the E-chip capacitive coupling system and method shown in FIG. 4, a lightweight ultra-thin battery is included in the system that supplies power to the microcontroller. In one embodiment, this battery is a button cell of 3.3 v and 100 mAh capacity. Ultra-thin batteries are also available in markets which are much thinner than those button cell batteries. In another embodiment, this battery may be embedded into the PCB board.

Referring now to FIGS. 6A and 6B, in some embodiments of the E-chip capacitive coupling system and method, the E-chip contains flat circular conductive layers made of copper or any other conductive material (marked as "A2" in FIGS. 6A and 6B). In one embodiment, this conductive layer is a thin layer of copper laid over dielectric substrate. Thickness of this copper layer is in order of few microns. This copper layer is coated with a layer of insulating material which is in order of few microns. This flat circular conductive layer forms one of the parallel plates of the capacitor. In one such embodiment, there are two layers in each chip, one on top and one at the bottom.

In some embodiments of the E-chip capacitive coupling system and method, the E-chip contains a flat circular insulating layer on top of the conductive layer that is marked as "A1" in FIGS. 6A and 6B. In one embodiment, this insulating layer is coated over flat circular conductive layers. This layer prevents the circular conductive layer being touched by ground ring when another chip is placed above or below. Thus, the circular insulating layer protects the circular conductive layer from being shorted to ground.

Continuing, in some embodiments of the E-chip capacitive coupling system and method, the E-chip contains a flat ring-shaped conductive layer that runs around the periphery of the chip that is marked as "B" in FIGS. 6A and 6B. In one embodiment, this is a thin nickel plated layer using Electro-less nickel plating. Typically, Nickel is selected as the material for this layer since it is a very good conductor of electricity, as well as being highly resistant to tarnish and wear. Electro-less nickel plating enables the surface to be very smooth and flat, thereby enabling a firm contact between chips when placed on top of each other. This smooth flat ring surface is used for grounding purpose between two chips. The ring-shaped conductive layer makes the circuit complete for communication between two chips.

Referring now to FIG. 5, in one embodiment of the E-chip capacitive coupling system and method, communication between the chips is described below. In this example, the chips are named T(op) and B(ottom). For chip T to send information to chip B, chip T's controller sends high frequency signals (containing data) to chip T's bottom conductive layer. This signal is then sent by capacitive coupling to the top layer of chip B. The top layer in chip B sends the signal to chip B's controller. In this manner, chip B receives the data from T. If chip B wants to send information to chip T, chip B's controller sends high frequency signal (containing data) to chip B's top conductive layer. The signal is then sent by capacitive coupling to the bottom layer of chip T. The bottom layer in chip T then sends the signal to chip T's controller. In this manner, chip T receives the data from chip B.

In another embodiment of the E-chip capacitive coupling system and method, the same logic may be extended if the chip stack has multiple chips. Each of the chips communicates with the chip above or below in the same manner as explained above. The bottom most chip on a chip stack communicates to the table transceiver in the same manner.

Figure 24:
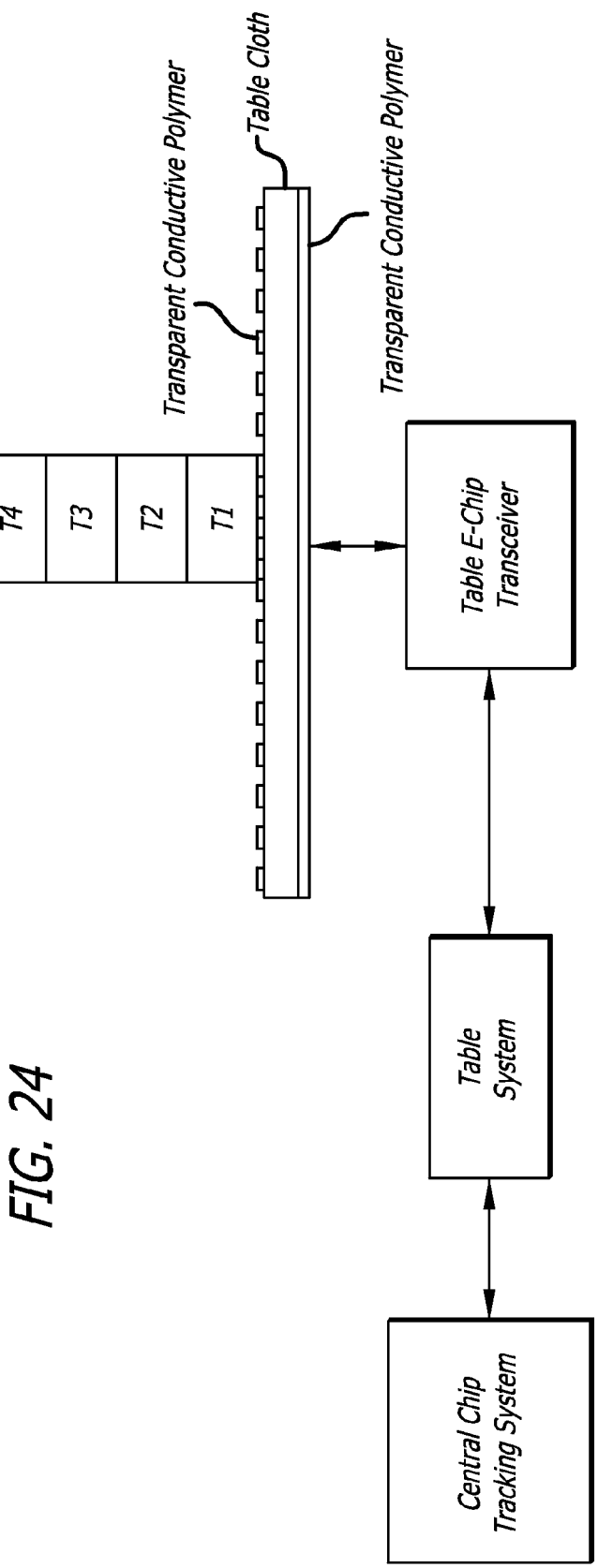
FIG. 24 illustrates a stack of chips, T-1 to T-N, placed on the table cloth, as well as the table E-Chip Transceiver, the table system, and the Central Chip Tracking System.

Referring now to FIG. 24, in another embodiment of the E-chip capacitive coupling system and method, a stack of chips T-N to T-1 are placed on the table. Chip T-1 is at the bottom of the table and Chip T-N is at the top. FIG. 24 illustrates how the data is communicated to the table transceiver from chip T-N to chip T-4, chip T-4 to chip T-3, and the like, and finally from chip T-1 to the table transceiver. Chip T-N sends information to chip T-4. Next, chip T-N's controller sends high frequency signal (containing data) to chip T-N's bottom conductive layer. The signal is then sent by capacitive coupling to the top layer of chip T-4. The top layer in chip T-4 then sends the signal to chip T-4's controller. In this manner, chip T-4 receives the data from chip T-N. Continuing, chip T-4 sends information to chip T-3. Next, chip T-3's controller sends high frequency signal (containing data) to chip T-3's bottom conductive layer. The signal is then sent by capacitive coupling to the top layer of chip T-2. The top layer in chip T-2 then sends the signal to chip T-2's controller. In this manner, chip T-2 receives the data from chip T-3. Accordingly, data gets progressively communicated to chip T-1. Chip T-1 sends information to table transceiver. Here T-1's controller sends high frequency signal (containing data) to chip T-1's bottom conductive layer. The signal is then sent by capacitive coupling to the top layer the table transceiver. The top layer in the table transceiver then sends the signal to the transceiver's controller. In this manner, the table transceiver receives the data from chip T-1.

Figure 7A:
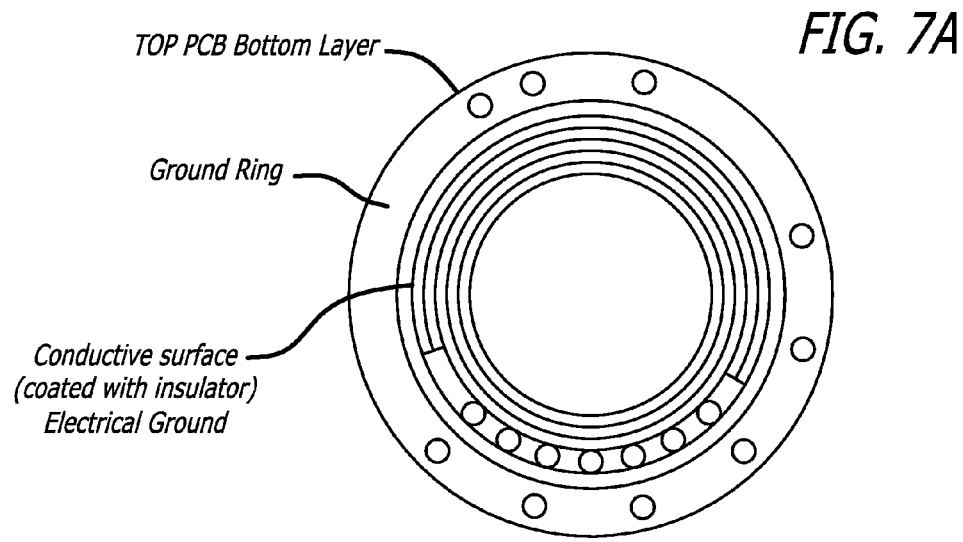
FIG. 7A illustrates a bottom view of an E-Chip Fabrication: Layer-1.
Figure 7B:
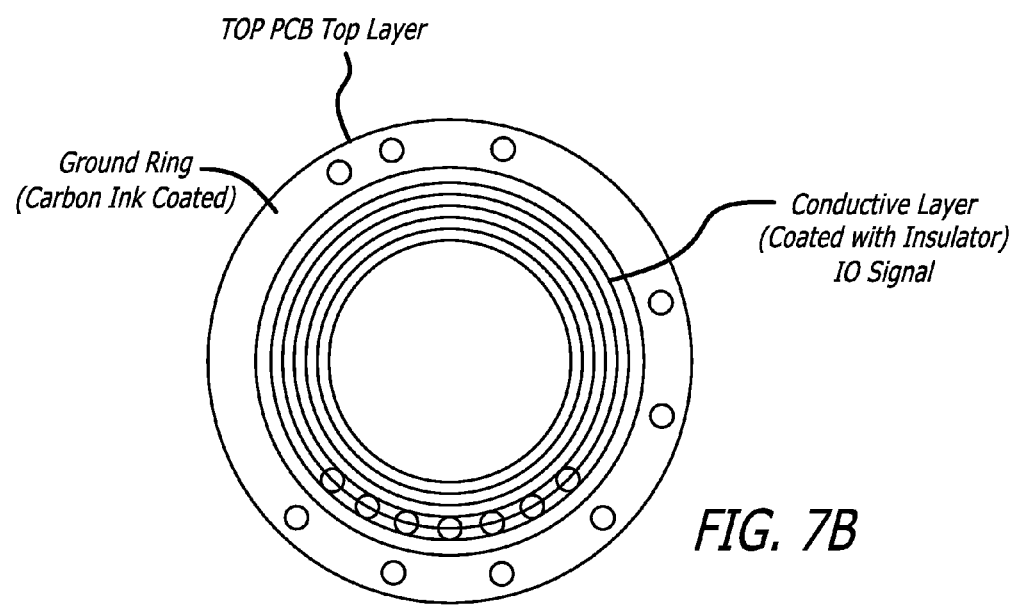
FIG. 7B illustrates a top view of an E-Chip Fabrication: Layer-1.
Figure 8A:
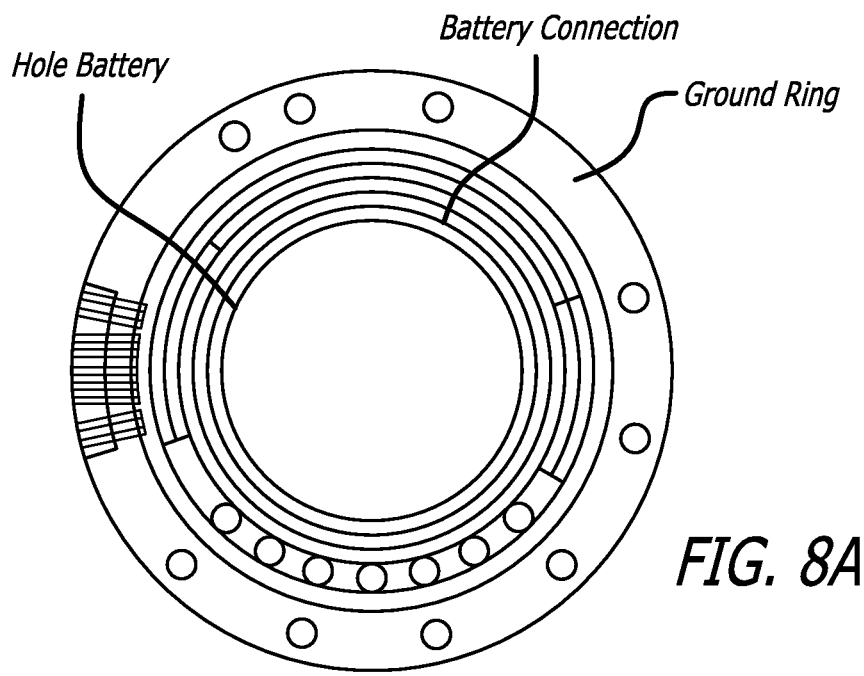
FIG. 8A illustrates a bottom view of an E-Chip Fabrication: Layer-2 and Layer-3.
Figure 8B:
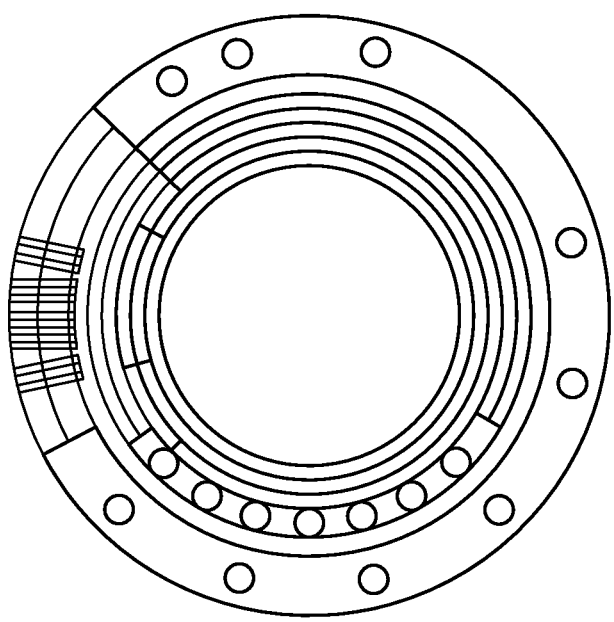
FIG. 8B illustrates a top view of an E-Chip Fabrication: Layer-2 and Layer-3.
Figure 9A:
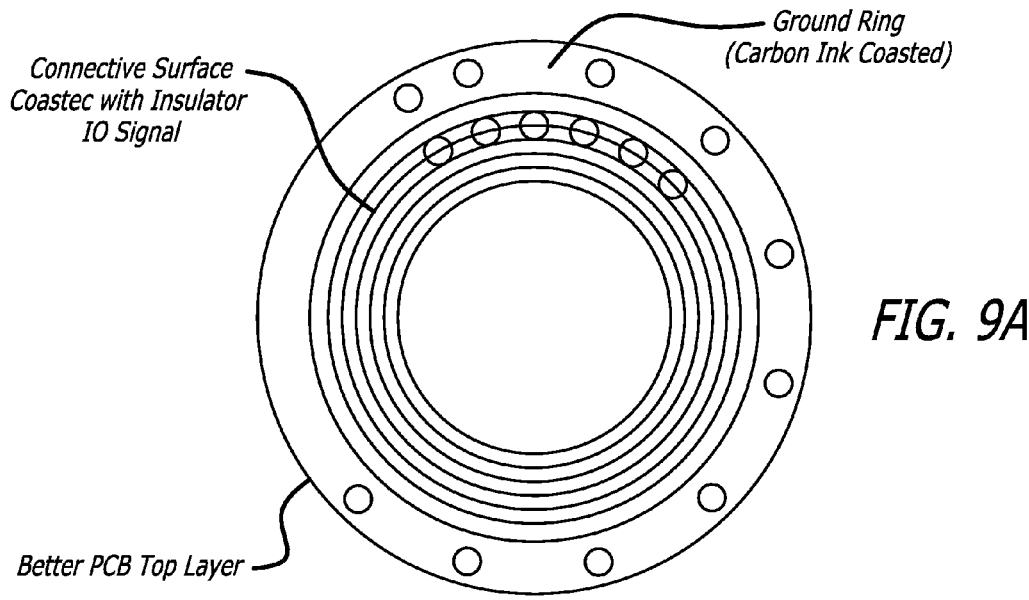
FIG. 9A illustrates a bottom view of an E-Chip Fabrication: Layer-4.
Figure 9B:
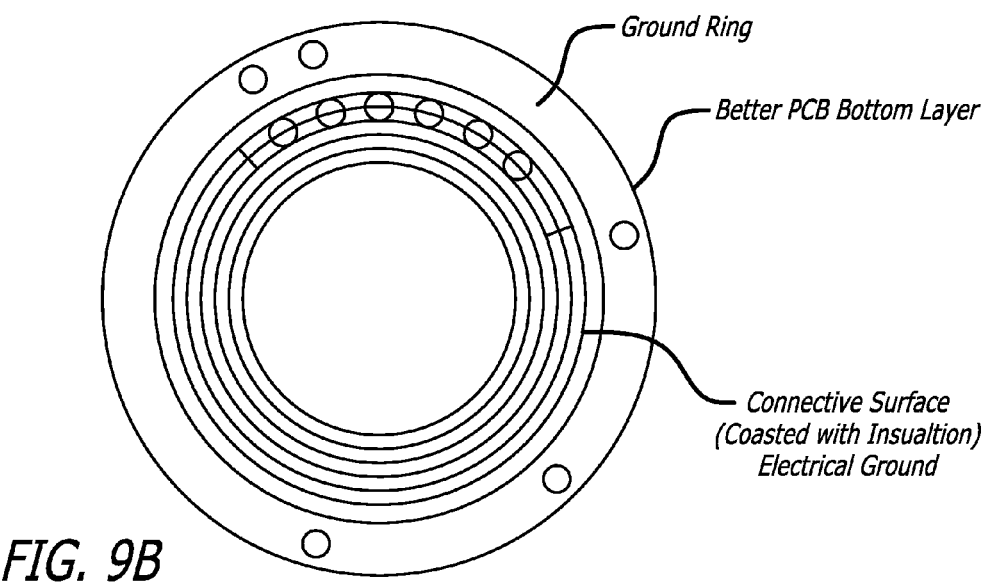
FIG. 9B illustrates a top view of an E-Chip Fabrication: Layer-4.

Refer now to FIGS. 7A-10, fabrication of E-Chip is described below accordingly to one embodiment of the E-chip capacitive coupling system and method. In one embodiment, an E-Chip has four PCB (Printed Circuit Board) layers. As shown in FIGS. 7A and 7B, Layer-1 is the top most layer of the PCB. In one embodiment, Layer-1 contains a flat conductive layer of copper, a layer of insulating material lay over circular conductive copper layer, and a flat conductive ring layer plated with nickel. As shown in FIGS. 8A and 8B, Layer-2 is the middle layer of the PCB. In one embodiment, Layer-2 contains an embedded battery for the electronics (which are in Layer-3). Layer-2 also contains electrical routing needed to connect Layer-1 and Layer-4. Additionally, Layer-2 is the thickest of all layers and provides mechanical strength to the chip. As noted above, Layer-3 contains the electronics (e.g., controller) used by the E-Chip to perform its operation. Layer-3 is the thinnest layer and is embedded into Layer 2. As shown in FIGS. 9A and 9B, Layer-4 is the bottom most layer. Layer-4 is a replica of the top layer in terms of dimension and functionality. In one embodiment, Layer-4 contains a flat conductive layer of copper, a layer of Insulating material lay over circular conductive copper layer, and a flat conductive ring layer plated with nickel.

Figure 10:
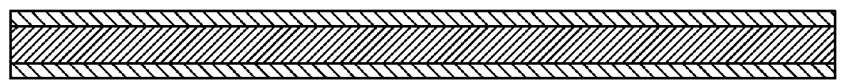
FIG. 10 illustrates an E-Chip Fabrication and thickness of each layer.

In one embodiment of the E-chip capacitive coupling system and method, these layers contain very tiny lead balls at their contacts points. When these layers are properly aligned, pressed together, and exposed to hot air, the lead balls in each layer melt and fuse the layers together, strongly holding each of these layers, and making the entire set of layers look like a single monolithic layer. Referring now to FIG. 10, in one embodiment, the thickness of the E-Chip is 3 mm, which is the same as an existing casino tournament chips. In other embodiments, the E-Chips may be thinner or thicker by using thinner or thicker PCBs, respectively. Since casinos typically desire to keep the "look and feel" of the E-Chips like a normal chip, painting of conductive ink or color may be done on the flat conductive ring. The painting may be performed using screen printing technology or any other technology for printing conductive ink smoothly over the surface.

Figure 11:
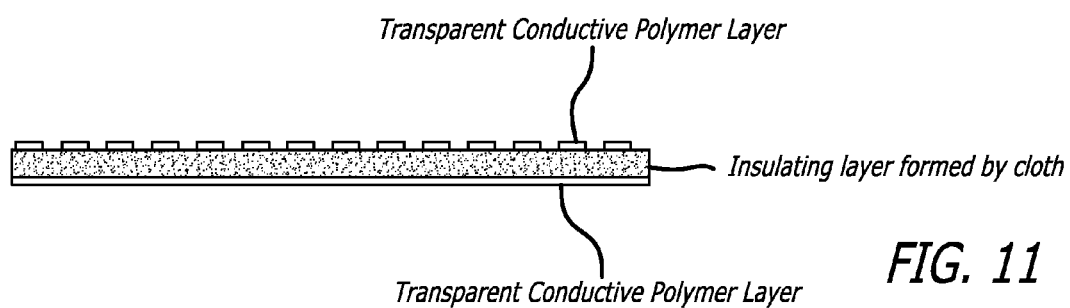
FIG. 11 illustrates a longitudinal view of the table cloth.
Figure 12:
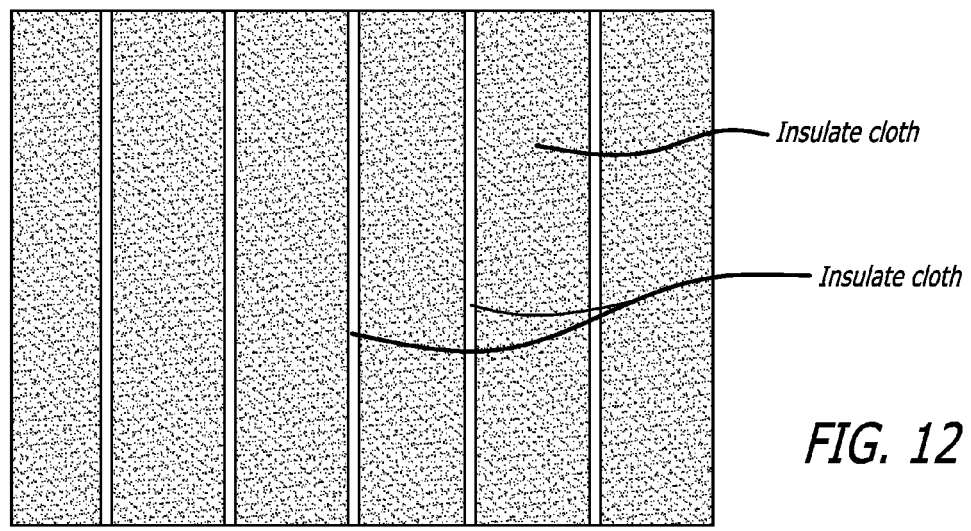
FIG. 12 illustrates a top view of the table cloth.

Referring now to FIGS. 11 and 12, the clothing on the gaming table is now described according to another embodiment of the E-chip capacitive coupling system and method. The table transceivers receive information from the E-chip stack placed on the table betting areas. To enable communication between the E-chip stack and the table transceivers, the cloth on the table is appropriately constructed and configured.

According to one embodiment, the longitudinal section of the table cloth is shown in FIG. 11. In one such embodiment, the clothing on the table has three layers. The top layer (which includes conductive polymer lines on the top) serves for grounding purpose. The top layer of the table is normally made of wool or polyester. The conductive polymer lines are printed on this layer. The thickness of the conductive polymer is on the order of few microns. This conductive polymer is transparent and is not be visible to the naked eye. Application of conductive polymer on the cloth does not cause any change in the cloth's look and feel. The distance between two conductive polymer lines is less than the diameter of the E-Chip.

Continuing, the middle (B) layer shown in FIG. 11 is the insulating textile layer. In one embodiment, this layer is water resistant so that any liquid spilled on it may be cleaned away. In another aspect, this layer is on the order of less than 1 mm.

Finally, the bottom (C) layer is also a conductive polymer layer. This bottom layer carries capacitive coupled high frequency signals to the transceiver. In one embodiment, the thickness of conductive polymer layer at the bottom of the table cloth is on the order of microns.

Figure 13:
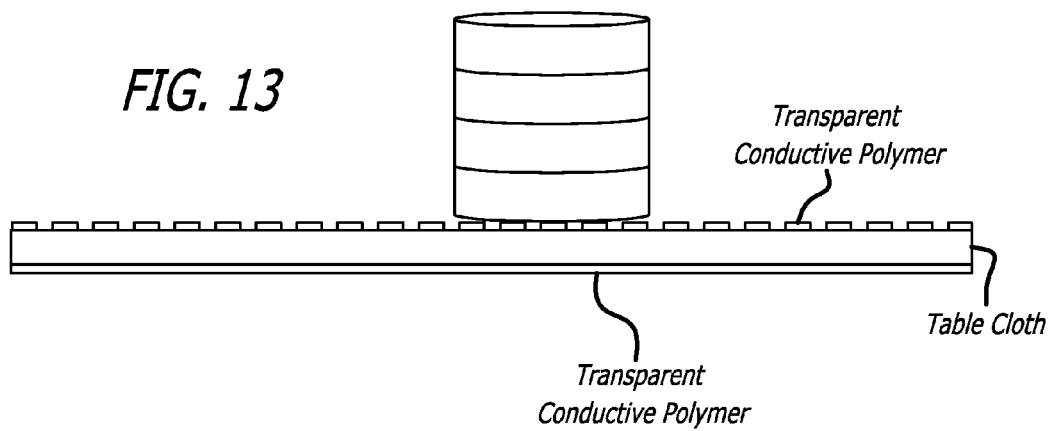
FIG. 13 illustrates a side view of the table cloth with the Transparent Conductive Polymer.

Referring now to FIG. 13, in another embodiment of the E-chip capacitive coupling system and method, the table transceiver circuitry is placed below the conductive polymer layer at several betting points. When an E-chip stack is placed in a betting area, the conductive ring in the bottom side of the bottom most chip touches the polymer lines on the top layer of the cloth. The polymer lines form the electrical ground, making the circuit complete. With the circuit complete, the bottom conductive layer of the E-chip and the conductive polymer at the bottom of the table clothing form the parallel plate capacitor. The insulating cloth layer acts as the dielectric medium between the parallel plates.

Figure 14:
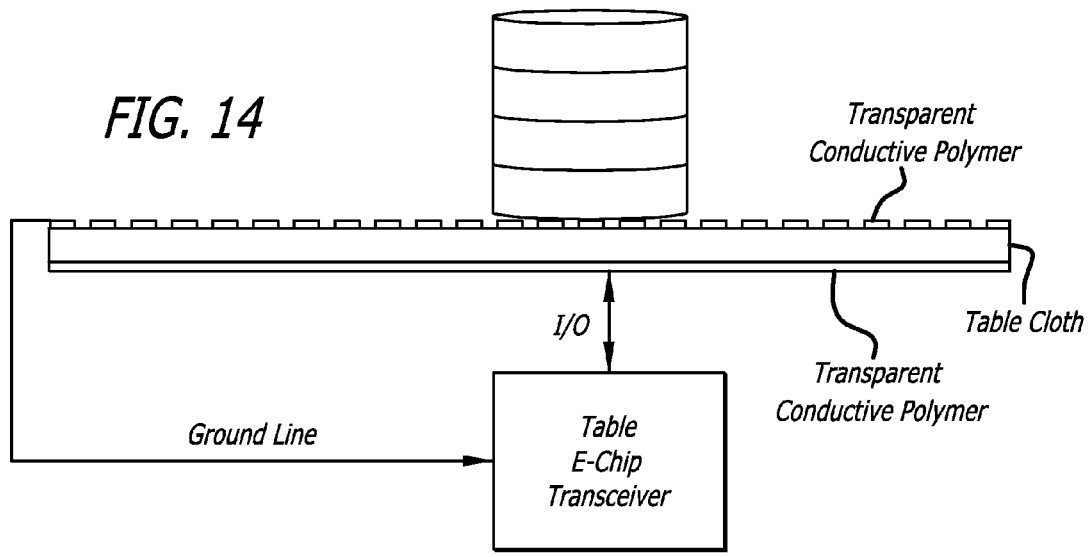
FIG. 14 illustrates a side view of the table cloth with the Transparent Conductive Polymer, as well as the Table E-Chip Transceiver.
Figure 15:
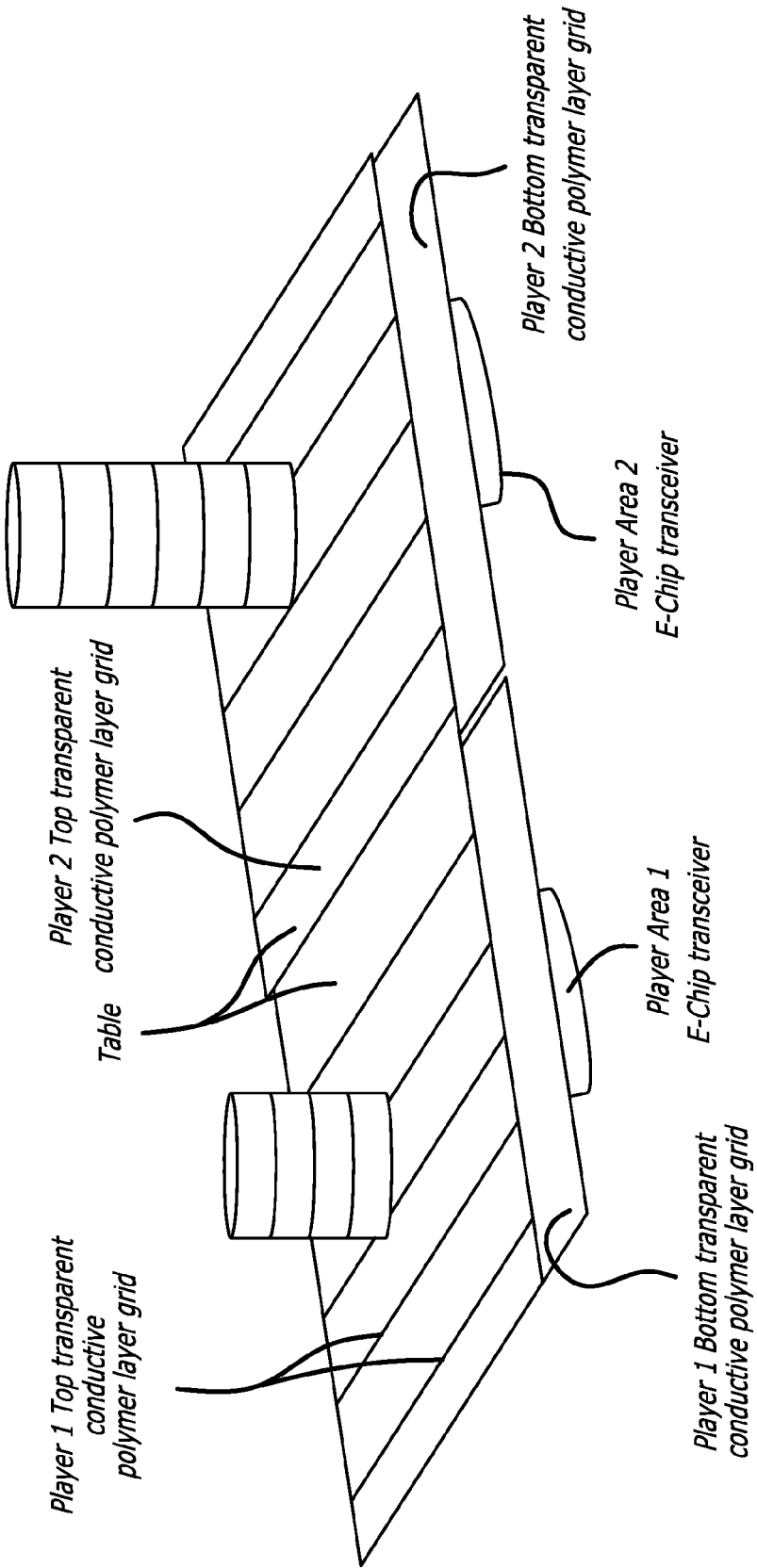
FIG. 15 illustrates a perspective view of the table cloth with a first player area and a second player area of the conductive polymer layer grid.

As shown in FIG. 14, in another embodiment of the E-chip capacitive coupling system and method, table transceivers are placed below the betting areas of the gaming table cloth. In one embodiment, the transceiver is a small embedded system with a microcontroller. The table transceivers poll for the presence of E-chip stacks. There can be multiple E-chip stacks on a given betting area. The table transceivers send the data obtained from the chip stack to the table system. In some embodiments, there are several table transceivers placed for a given table. FIG. 15 shows an example of a table layout.

Figure 16:
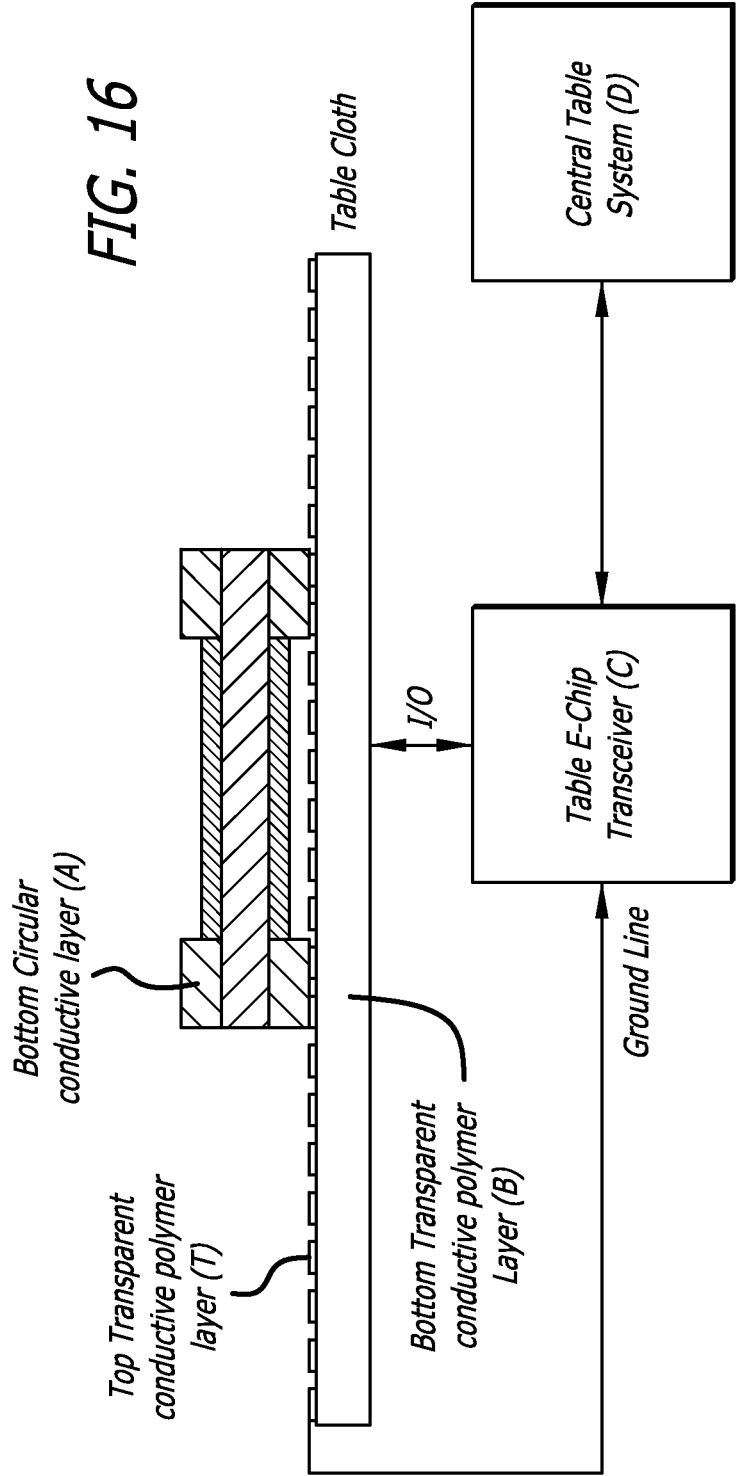
FIG. 16 illustrates a side view of the table cloth with the Transparent Conductive Polymer, as well as the Table E-Chip Transceiver and Central Table System.

As shown in FIG. 16, in another aspect of the E-chip capacitive coupling system and method, the E-chip stack communicates with the table transceiver using capacitive coupling. In this embodiment, the conductive ring of bottom chip (A) in the stack touches the polymer lines on top surface of the cloth (T). This makes the conductive ring electrically grounded and hence completes the circuit. A parallel plate capacitor is formed between the bottom conductive layer of the bottom most chip (A) on the table and the conductive polymer layer of the table cloth (B). The bottom conductive polymer of the table cloth is connected as an input to the controller of the table transceiver (C). The bottom most E-chips sends high frequency signal to the table transceiver through the capacitive coupling between the E-chip stack and table transceiver. The table transceiver controller is connected to the table system (D).

In one embodiment, the table system polls each table transceiver at a fixed frequency. If there is an E-chip stack on a betting area, the transceiver polls the E-chip stack, starting the communication with the bottommost E-chip of the stack, and progressively communicating up to the topmost chip of the stack. The response of the topmost E-chip is progressively communicated to the bottom most chip and then to the table transceiver. In another aspect, there are several table transceivers for a given table. The table transceivers are attached to the table. All the table transceivers send the data to the table system.

Referring to another aspect of the E-chip capacitive coupling system and method, the central table system is now described. The central table system is a PC based system connected to the table transceivers through a custom multiplexer or wireless medium like Bluetooth, Wi-Fi, and the like. The multiplexer/Bluetooth/Wi-Fi receives the input from the table transceivers and sends the input to the central table system through a communications port such as serial port or USB. In one embodiment, the central table system polls each of the transceivers periodically. As such, when an E-chip stack is kept on the table, it is immediately recognized by the table system. The table system monitors the E-chip stack placements in betting areas, generates alerts on fraudulent chips, and reports the association of player and chips to the central chip tracking system.

Figure 17:
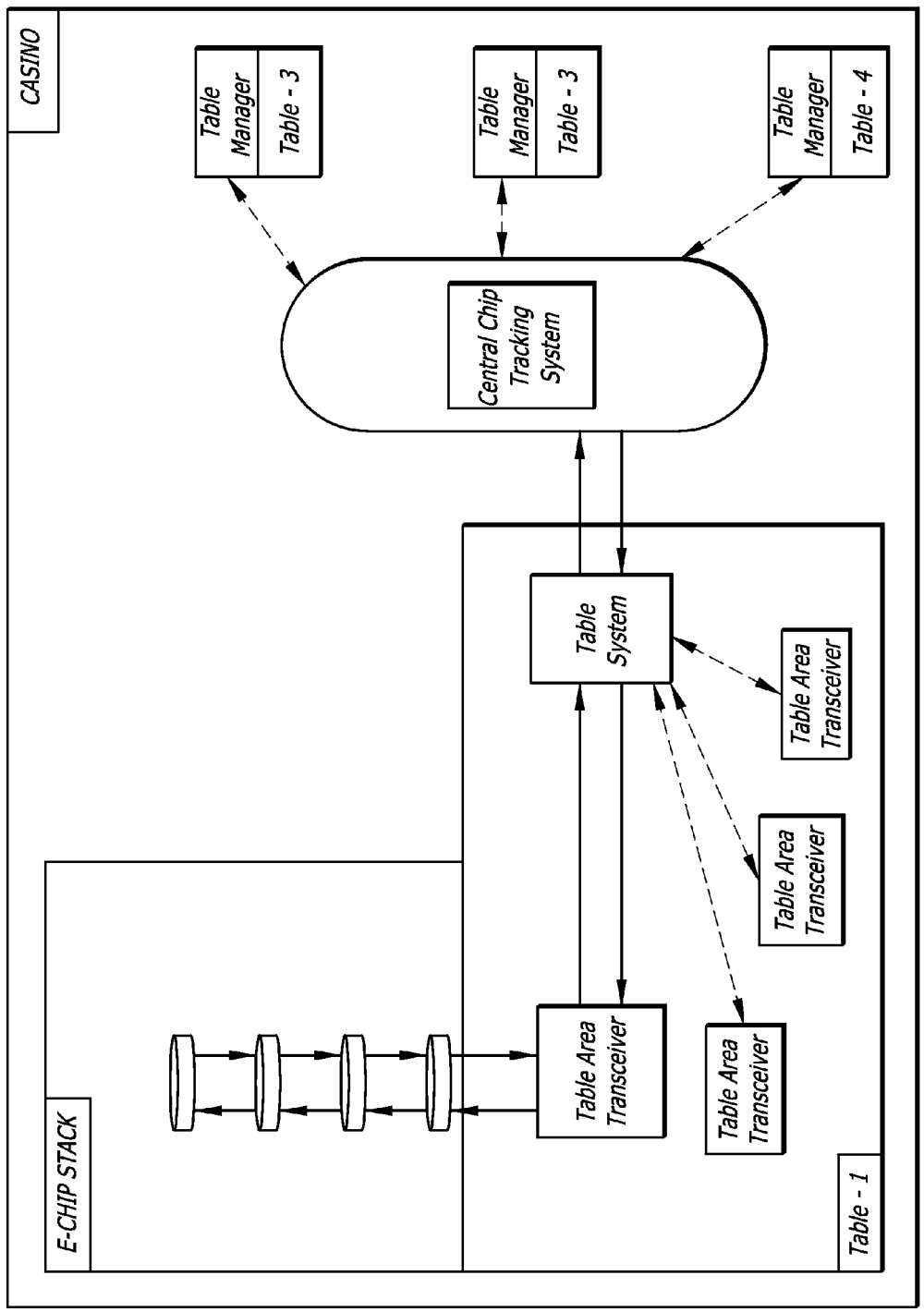
FIG. 17 illustrates a layout view of the E-Chip stack, the tables, the table area transceiver, the table system, the Central Chip tracking system, and the casino floor.

Referring to still another aspect of the E-chip capacitive coupling system and method, the central chip tracking system is now described, as shown in FIG. 17. The central chip tracking system is a server based system that is connected to the table system on each table. Continuing, the central chip tracking system receives input from the table systems periodically and keeps track of chips issued to players. Additionally, the central chip tracking system is configured to: (1) track E-chip inventory, such as the number of E-chips issued and available; (2) track the mapping between player ID and chip IDs; (3) Keep track of mapping between table id and chips; (4) track the mapping between dealer ID and E-chips; and (5) generate reports on the E-chip data.

With respect to another aspect of the E-chip capacitive coupling system and method, the E-chip functional scenarios are described below. An E-chip stack may be placed in multiple ways by a patron or a dealer on a gaming table. In a first example shown in FIG. 18, the E-chips are completely lined up with each other, with each E-chip completely overlapping the E-chip below it. In a second example shown in FIG. 20, the E-chips partially overlap, with part of the E-chip's top and bottom surfaces overlapping the E-chip above or below it. In a third example shown in FIG. 22, the E-chips do not overlap, but have a tilted/sliding contact.

Figure 18:
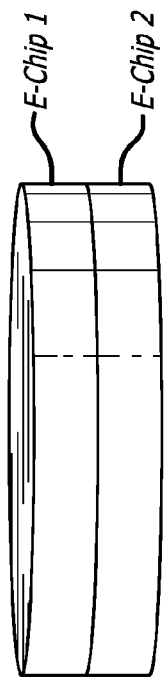
FIG. 18 illustrates a side view of two squarely stacked E-Chips; E-Chip 1 and E-Chip 2.
Figure 19:
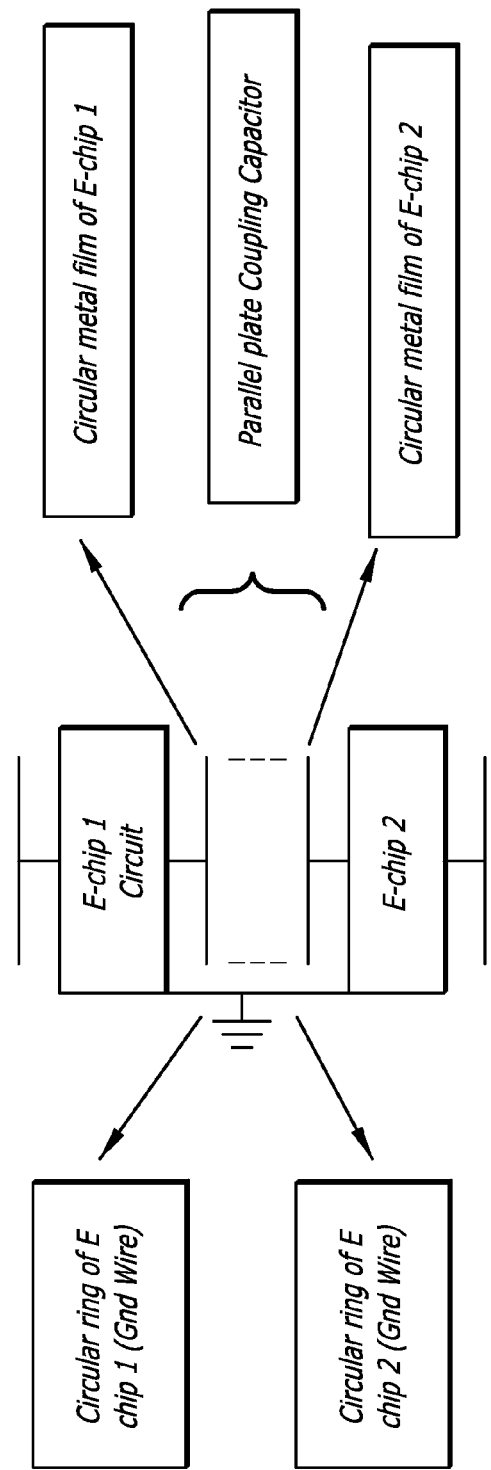
FIG. 19 illustrates a circuit diagram of E-Chip 1 and E-Chip 2, as shown in FIG. 18.

Referring again to the first example shown in FIG. 18, the scenario of perfectly overlapping E-Chips is described. In this first example, two E-Chips placed on top of each other to form a perfectly overlapping stack of E-Chips. Since the E-Chips overlap fully, the conductive ring ensures common grounding between two E-Chips. The top conductive layer of bottom E-Chip and bottom conductive layer of E-Chip top act as plates of a parallel plate capacitor. These two plates are separated by a thin layer of air in between the chips as dielectric. Even a thin insulator coating on a conductive layer contributes as an effective dielectric. FIG. 19 shows an electrically modeling of a stack of perfectly overlapping E-Chips. Since the E-Chips are perfectly overlapping each other effective capacitance is at a maximum, making inter-chip capacitive communication possible.

Figure 20:
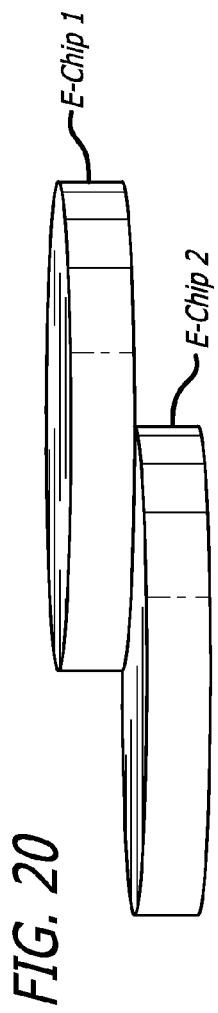
FIG. 20 illustrates a side view of two off-center stacked E-Chips; E-Chip 1 and E-Chip 2.
Figure 21:
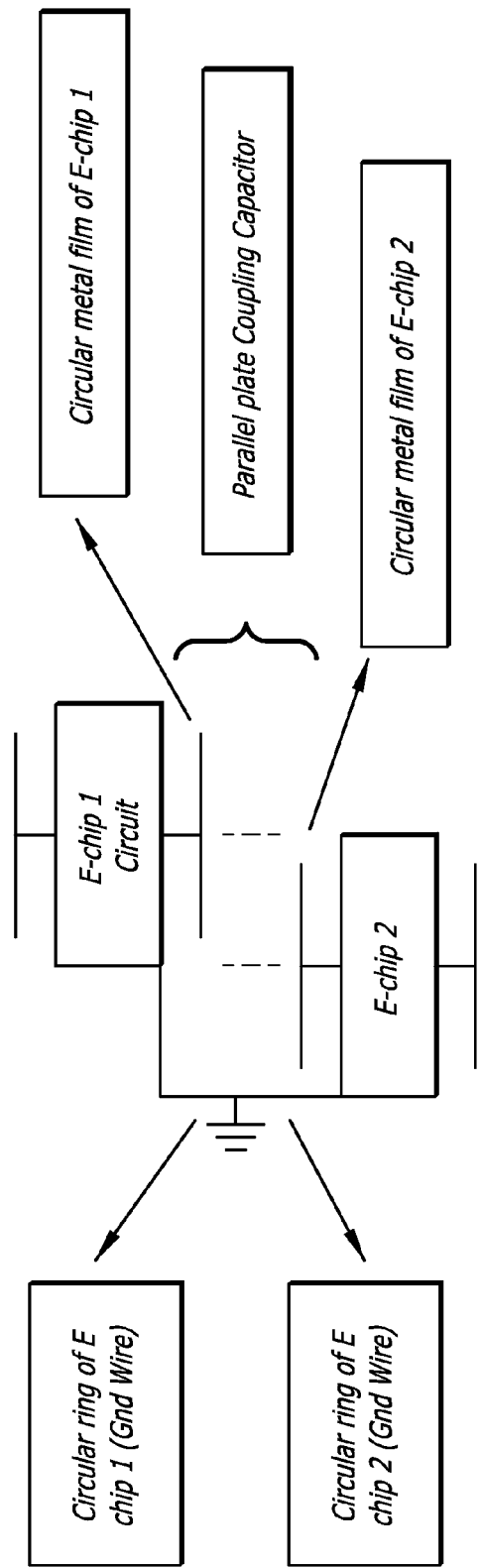
FIG. 21 illustrates a circuit diagram of E-Chip 1 and E-Chip 2, as shown in FIG. 20.

Referring again to the second example shown in FIG. 20, the scenario of partially overlapping E-Chips is described. In this second example, two E-Chips are placed in a partially overlapping configuration to form a stack. Though the E-Chips only overlap partially, the conductive rings of the two E-Chips touch each other and ensure common grounding between two E-Chips. Due to this configuration, the top conductive layer of the bottom E-Chip and bottom conductive layer of the top E-Chip act as plates of a parallel plate capacitor. These two plates are separated by a thin layer of air in between the chips as a dielectric. Even a thin insulator coating on a conductive layer contributes as an effective dielectric. FIG. 21 shows an electrically modeling of a partially overlapping stack of E-Chips. Since E-Chips are partially overlapping, the effective capacitance decreases. However, this decreased capacitance has been found sufficient enough for inter chip capacitive communication.

Figure 22:
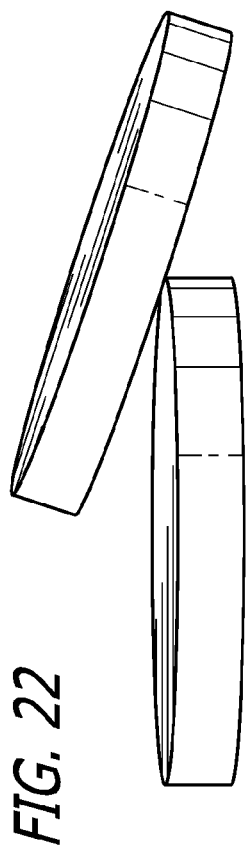
FIG. 22 illustrates a side view of two partially stacked E-Chips; E-Chip 1 and E-Chip 2.
Figure 23:
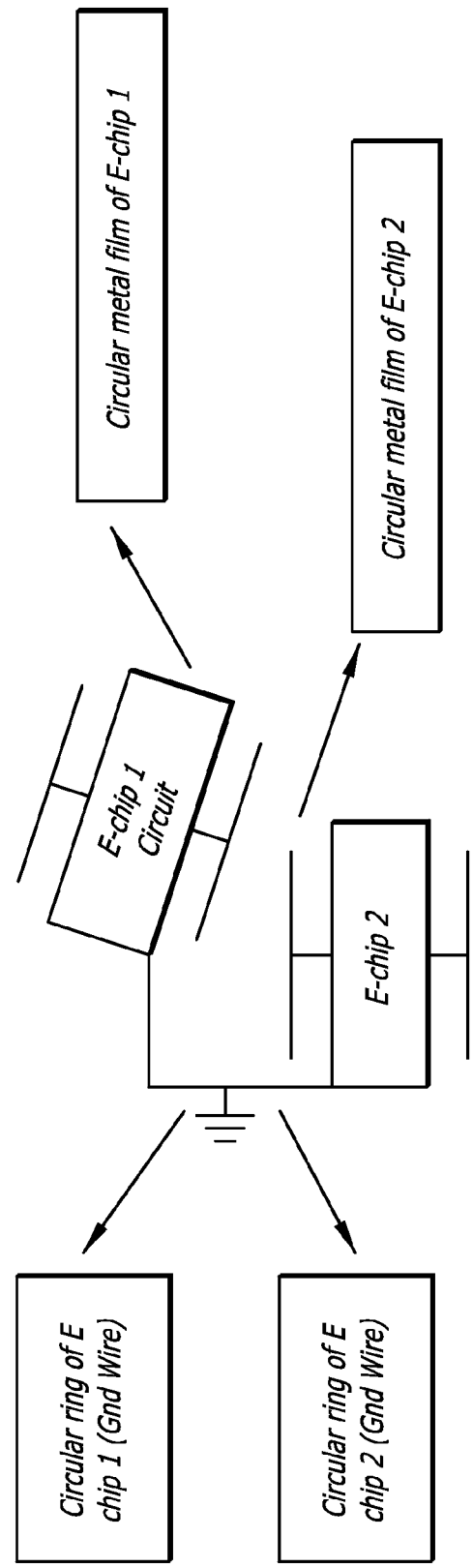
FIG. 23 illustrates a circuit diagram of E-Chip 1 and E-Chip 2, as shown in FIG. 22.

Referring again to the third example shown in FIG. 22, the scenario of E-Chips in a Tilted/Sliding position is described. In this embodiment, a parallel capacitor cannot be formed and hence the E-Chips cannot communicate with each other. FIG. 23 shows an electrically modeling of a tilted/sliding stack of E-Chips. Since the E-Chips are not overlapping in this third example, the effective capacitance is zero. Due to the effective capacitance being zero, it is not possible to have inter-chip capacitive communication when the chips are configured in this manner.

The following example is a functional description of E-Chip stack communication flow in one embodiment of the E-chip capacitive coupling system and method, as shown in FIG. 24. In this example, a stack of chips are named E-Chip T1, T2, . . . Tn. E-Chip T1 is placed at the bottom of the stack touching the table while E-Chip Tn is at the top of the stack. Below are use cases that provide examples of E-Chip stack table communication flow.

This example begins with the issuance of E-Chips to a player. First, the player provides his player card to the dealer. The dealer swipes the player card. The player attempts to purchase a certain value of E-Chips. The dealer then picks up the E-Chips from the dealer E-Chip stack. The E-Chips are placed on the "chip issue" area on the dealer side of the table. If player is issued a stack of E-Chips, named T1, T2, . . . Tn, E-Chip T1 is placed at the bottom of the stack touching the gaming table, while E-Chip Tn is at the top of the stack.

The table transceiver sends a periodic poll with casino ID to check if an E-Chip stack has been placed. If there is no stack placed, the table transceiver does not receive a response. When the E-Chip T1 touches the table, it receives the poll from the transceiver. The E-Chip T1 then validates the casino ID of the table transceiver and forwards the poll to E-Chip T2, which in turn validates the E-Chip T1 casino ID and forwards the poll to E-Chip T3. Finally, the poll reaches E-Chip Tn at the top of the stack. When the E-Chip Tn attempts to forward the poll, it does not receive a response, since E-Chip Tn is the top of the stack. Thus, E-Chip Tn determines that it is the top of the stack.

At this point of time, the player ID in the E-Chip is null (i.e., the E-Chip belongs to dealer). In some embodiments, the chip contains other details such as casino ID, Chip ID, Chip denomination, and the like. The E-Chip Tn sends the casino data and chip data to E-Chip T(n−1) (as well as the player ID which is null). The E-Chip T(n−1) then compares the casino data of E-Chip Tn to validate E-Chip Tn. If there is a match, E-Chip T(n−1) sends its casino data along with E-Chip Tn and E-Chip T(n−1) chip data to T(n−2). The E-Chip T(n−2) compares the casino data of T(n−1) to validate the Tn. If there is a match, E-Chip T(n−2) sends its casino data along with Tn, T(n−1), and T(n−2) chip data to T(n−3). This process continues until the E-Chip T1 is reached.

The E-Chip T1 sends the accumulated chip data from the E-Chip Tn through the E-Chip T1 to the table transceiver. The table transceiver sends the E-Chip Tn through the E-Chip T1 chip data, transceiver ID, and the player ID to the table system. The table system records the chip data against the player ID which is null. Next, the table system sends the player ID of player whose player card has been swiped to the table transceiver. The table transceiver sends poll with the player ID of player whose player card has been swiped along with casino ID to E-Chip T1, which validates casino ID and writes the player ID on the controller memory. It then sends the player ID and casino ID to E-Chip T2. E-Chip T2 receives the player ID from E-Chip T1 which writes the player ID on the controller memory. It then sends the player ID to E-Chip T3. This process continues until E-Chip Tn is reached.

When the E-Chip Tn realizes that it is the top chip, it sends back a player ID, along with chip data and casino data to E-Chip T(n−1), which is forward successively to E-Chip T1, then the table transceiver, and finally to the table system. At this point, the E-Chip stack has been associated with the particular player ID. Accordingly, the player may take the E-Chip stack and begin wagering.

Optionally, E-Chips may store player position at a gaming table instead of using player card identification. In another embodiment, this system may be used for uncarded players, as well.

Figure 25:
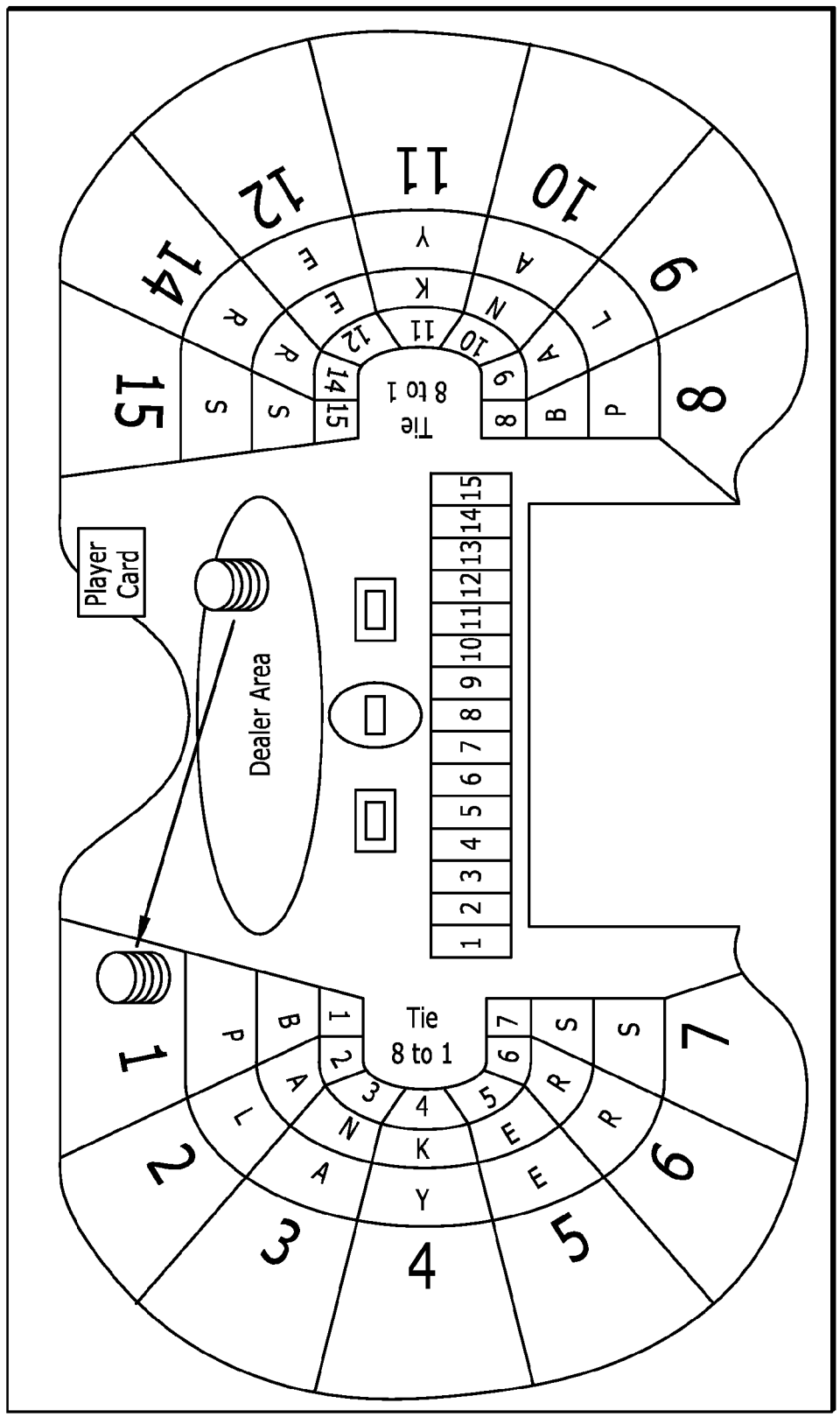
FIG. 25 illustrates a stack of chips being moved from a Dealer area to a first player area on the table cloth, which is mapped to a Baccarat table.

The following example is a functional description of E-Chip stack communication flow on a Baccarat table in one embodiment of the E-chip capacitive coupling system and method, as shown in FIG. 25. First, the player buys $50 worth of E-chips. Then the dealer issues five E-chips worth $10 each. The dealer places the E-chip stack (five $10 chips) in the dealer area. Next, the player ID is entered into the table system (e.g., the player swipes his player card). The table system sends message containing the Player ID to the table transceiver connected to dealer area. Next, the table transceiver sends message containing Player ID and casino ID to the bottommost E-chip in the E-chip stack. The bottommost E-chip validates the casino ID sent by the transceiver and then writes the player ID into the RAM. Player ID is written only if the player ID is previously null. If the player ID is already present, then an alert message is sent to the table system.

Continuing, the bottommost chip propagates the message containing the player ID and casino ID to the E-chip above it. The E-chip above sends the message containing player ID and casino ID to the next E-chip. This process continues until the topmost E-chip receives the message. The topmost E-chip attempts to send the message containing the player ID and casino ID from the E-chip above it. However, since there is no E-chip above, top-most E-chip does not receive an ACK (acknowledgement) response within a set time period and then "times out." Accordingly, since the topmost E-chip does not receive any response, it determines itself to be the topmost E-chip. Next, the top-most chip E-chip its message containing player ID, casino ID, and aggregated denomination to the E-chip below it. Upon receiving the message from topmost E-chip, the E-chip below it validates casino ID sent and aggregates its denomination.

The E-chip below the topmost E-chip sends its message which contains the aggregated denomination (i.e., the sum of all the denomination values starting from the topmost E-chip to the current E-chip), player ID, and casino ID. This process continues until the bottommost E-chip is reached. The bottom E-chip sends the total denomination values of the E-chip stack, casino ID, and player ID to the table transceiver. The table transceiver sends the data to the table system. The table system records player ID, and the value of chips. This value is sent to central chip tracking server. The central server updates player chip relation. The central server communicates back to table manager and to the table transceiver. Hence, any information from central server may be sent to individual E-chip stack placed on the table. Finally, the dealer gives the E-chip stack to the player with his player ID stored in RAM of each E-chip.

The following example is a functional description of E-Chip stack communication flow for a player placing a bet at a gaming table, according to one embodiment of the E-chip capacitive coupling system and method, as shown in FIG. 24. First, the player chooses a betting area. Next, the player places part of the stack of chips or the complete stack of chips that he has purchased in the betting area. In this embodiment, the player places a stack of chips named E-Chip T1, E-Chip T2, . . . E-Chip Tn on the betting area. The E-Chip T1 is placed at the bottom of the stack touching the table while the E-Chip Tn is at the top of the stack of E-Chips. The table transceiver below the betting area sends a periodic poll to check if an E-Chip stack has been placed. If no E-Chip stack has been placed, the table transceiver does not receive a response. If the E-Chip T1 is touching the table, it receives the poll from the table transceiver. The E-Chip T1 then forwards the poll, which contains the casino ID, to the E-Chip T2 which in turn forwards the poll to the E-Chip T-3. Finally, the poll reaches the E-Chip Tn at the top of the stack. The E-Chip Tn attempts to send the poll to an E-Chip above it; however, since the E-Chip Tn is the top of the stack, the E-Chip Tn does not receive a response. Accordingly, the E-Chip Tn concludes that it is the top of the stack.

The E-Chip Tn sends the casino data, player ID, and chip data to the E-Chip T(n−1). The E-Chip T(n−1) validates the E-Chip Tn casino ID. If there is a match, E-Chip T(n−1) sends its casino data, player ID, and accumulated chip data (along with Tn's chip data and player ID) to the E-Chip T(n−2). The E-Chip T(n−2) validates the E-Chip Tn-1 casino ID. If there is a match, E-Chip T(n−2) sends its casino data, player ID and chip data along with accumulated chip data and player ID for E-Chip Tn and E-Chip T(n−1). This information is sent to E-Chip T(n−3). This process continues until the E-Chip T1 is reached. At this point of time the E-Chip T1 has: (1) Player ID in chips from E-Chip T2, E-Chip T3, . . . to E-Chip Tn; and (2) accumulated chip data of E-Chips from E-Chip T2, E-Chip T3, . . . to E-Chip Tn. The E-Chip T1 sends the accumulated chip data from the E-Chip T-1 through E-Chip Tn to the table transceiver. The table transceiver sends the E-Chip T-1 through E-Chip Tn chip data, transceiver ID, and the player IDs to the table system. The table system records the chip data against the player IDs. There can be multiple player IDs on the given stack of chips. This procedure records information on player ID/bet amount/bet area information.

As described above, each bet area can be sending information on various chip stacks kept on the table at the same time. All of this is data is accumulated by the table system and the chip tracking system. The accumulated data can be as follows:

| Area(Transceiver ID) | Player ID | Chip Ids | Total Value |
| --- | --- | --- | --- |
| 1 | 1001 | C-121, C-237 | 30 |
| 2 | 1015 | C-175, C-289 | 40 |
| 3 | 1077 | C-189, C182, C333 | 100 |
| 4 | 9299 | C-888, C891, C-234 | 200 |
| 5 | 9298, 1001 | C-111, C122 | 100 |

According to one embodiment of the E-chip capacitive coupling system and method, and based on the rules of the current game, the system may enable multiple players to keep their chips on the same stack. For example, in Roulette, many patrons may keep their chips in same stack. In such an embodiment, the transceiver accepts multiple player IDs, along with chip data, for the same chip stack. However, in a game like Baccarat, a patron cannot keep his chips on another player stack. In this case, the table transceiver will not accept multiple player IDs along with chip data for the same chip stack. Instead, the table transceiver will flag an error.

Figure 26:
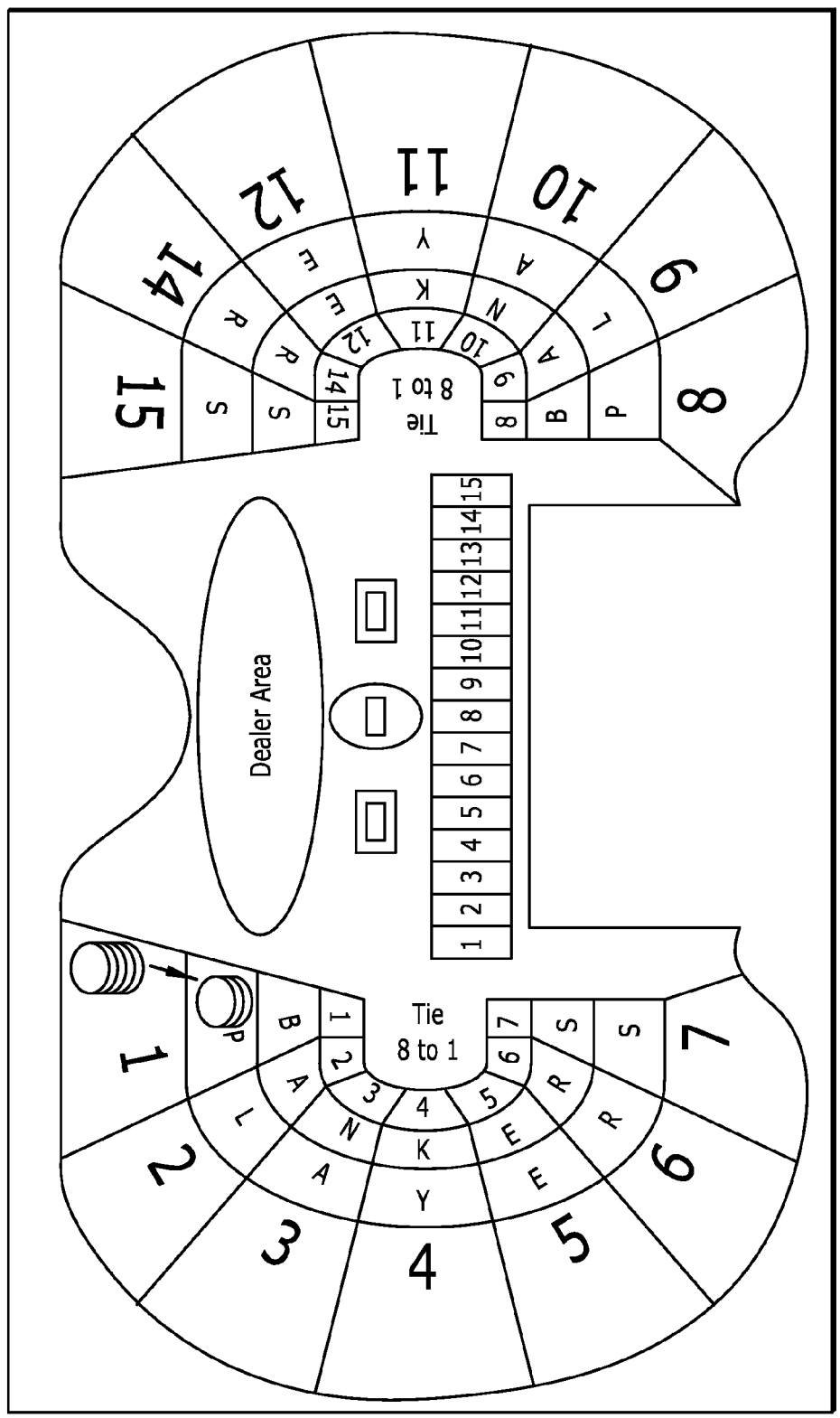
FIG. 26 illustrates a stack of chips being moved from a first player area to a player betting area on the table cloth, which is mapped to a Baccarat table.

The following example is a functional description of E-Chip stack communication flow on a Baccarat table in one embodiment of the E-chip capacitive coupling system and method, as shown in FIG. 26. The player bets three E-Chips worth $10 each by placing an E-Chip stack in player betting area. The table system sends the CalculateAmt message with casino ID to the table transceiver connected to betting area. The table transceiver sends message CalculateAmt and casino ID to the bottommost E-Chip in the E-Chip stack. The bottommost E-Chip validates the transceiver and propagates the CalculateAmt message to the E-Chip above it. The E-Chip above sends the CalculateAmt message to the next chip. This process continues until the topmost E-Chip receives the message from the bottommost E-Chip. Finally, the topmost E-Chip attempts to sends the message containing Casino ID and Calculate amount message to the E-Chip above it. However, since there is no E-Chip above, the topmost E-Chip does not receive any ACK (acknowledgement) response within a preset time period, and thus, "times out." Since the topmost E-Chip does not receive any response, it determines itself to be the topmost E-Chip.

Continuing, the topmost E-Chip sends its SendDenom message, which contains its denomination, Player ID and casino ID. The E-Chip below the topmost E-Chip sends SendDenom message, which contains the aggregated denomination (sum of all the denomination values starting from the topmost chip up to the current chip), player ID, and casino ID. This process continues until the bottommost E-Chip is reached. The bottommost E-Chip sends the total denomination values of the chip stack, player ID, and casino ID to the table transceiver. The table transceiver validates the bottommost E-Chip and sends the data to the table system. The table system records player ID and the value of chips. This information is sent to central table server. The central server then communicates back to the Table Manager and to the table transceiver. Hence, any information from the central server can be sent to individual E-Chip stacks placed on the table.

The following additional example is a functional description of E-Chip stack communication flow for a player placing a bet at a Baccarat table, according to one embodiment of the E-chip capacitive coupling system and method. After the dealing is done, the patrons either win or lose. When a patron wins, the patron is issued newer E-Chips. The process is same as the one described above. In one example, patron 1 has placed bets on Player area of Baccarat Table. This begins with the patron occupying betting area 1. The patron places a $100 bet on "the player." After the deal, "the player" wins. The patron wants to reach $200. Dealer places $100 worth of E-Chips in betting area 1 on the player box. These E-Chips have the player ID as null. The table transceiver reads the player ID as null. Since the table transceiver knows the status of the deal, the table transceiver writes the player ID into all of the E-Chips in the E-Chip stack. Finally, the information on chip data is entered into the table system and communicated to the chip tracking system.

The following additional example is also a functional description of E-Chip stack communication flow for a player placing a bet at a Baccarat table, according to one embodiment of the E-chip capacitive coupling system and method; however in this example, but the patron has lost. In this example, the patron has occupied betting area 1. Next, the patron has placed $100 bet on "the player." After the deal, "the player" loses. The patron wants to get back the $100 he has bet and lost. The dealer takes the E-Chip stack from betting area 1 on the player box. The dealer places the E-Chip stack in the dealer area, and marks a return on the system. The dealer transceiver then reads the player ID and the chip data and dissociates the chips from the player ID. Next, the dealer transceiver writes the player ID as null on all the E-Chips in the E-Chip stack. These E-Chips may be issued to another patron. The above solution works for games like Baccarat, Blackjack, poker, and the like, where each patron has a specific bet area. For games like Sic Bo and Roulette, the above approach is different.

Another aspect of the E-chip capacitive coupling system and method is directed towards E-Chip accounting. At the beginning of each accounting day, a dealer is given a set of E-chips. The E-chips may be dispensed to the dealer in the following ways: (1) using an automated dispenser that dispenses the E-chips with information such as dealer ID and all player IDs to Null, and (2) entering chip data against the dealer in the E-Chip accounting database. At the end of the business day, the dealer returns the E-chips. An automated sorting machine sorts and counts the E-chips. Additionally, the dealer IDs are read. There can be E-chips with different dealer IDs as patrons can keep moving around tables. The dealer ID/chip ID return details are accounted for in the database. At the end of the accounting day, system has information such as E-Chip IDs associated with the dealer, E-Chip IDs associated with players, E-Chips not issued (inventory), and casino liability (chips still with players).

In one embodiment of the E-chip capacitive coupling system and method, fake/bad E-chips may be identified without using special equipment. In one scenario, one of the E-chips in the E-chip stack is bad/corrupted or counterfeit. A bad E-chip chip is a genuine E-Chip with the dead battery (or with another component(s) that has become corrupt). For example, it is also possible for the microcontroller to become corrupt. In another scenario, one of the E-Chips in the stack may be a fake (i.e., counterfeit) E-Chip. Such a fake E-Chip looks like a genuine E-Chip, but does not have the same circuitry inside of the E-Chip. If the bad or fake E-Chip is placed in an E-Chip stack, table transceiver receives data up to the E-Chip below the bad/fake E-Chip. For example, in a stack of E-Chip T1 to E-Chip Tn, if E-Chip Tk is faulty, the transceiver receives data from E-Chip T1 to E-Chip T(k−1). The E-Chip Tk does not respond since it is not a functional/genuine E-Chip. Since the expected value and the actual value of the E-Chip stack do not tally, it can be determined that E-Chip Tk is the faulty E-Chip.

In another embodiment of the E-chip capacitive coupling system and method, fake/bad E-chips may be identified using special equipment that supplies current to the controller of an E-Chip to find out if it is a genuine E-Chip. In such an embodiment, the fake/bad E-chip identification equipment has a transceiver similar to one on the gaming table. Additionally, the fake/bad E-chip identification equipment may include a tool to pierce through the top layer of a suspect E-chip and provide power to the microcontroller. If the microcontroller of the suspect E-chip is functional, the microcontroller communicates its chip data to the transceiver. In this manner, the fake/bad E-chip identification equipment assists in identifying bad/corrupted E-chips. If the fake/bad E-chip identification equipment is used on a fake (i.e., counterfeit) E-Chip, the transceiver does not receive any data from the E-chip, enabling the determination of a fake chip.

Figure 27A:
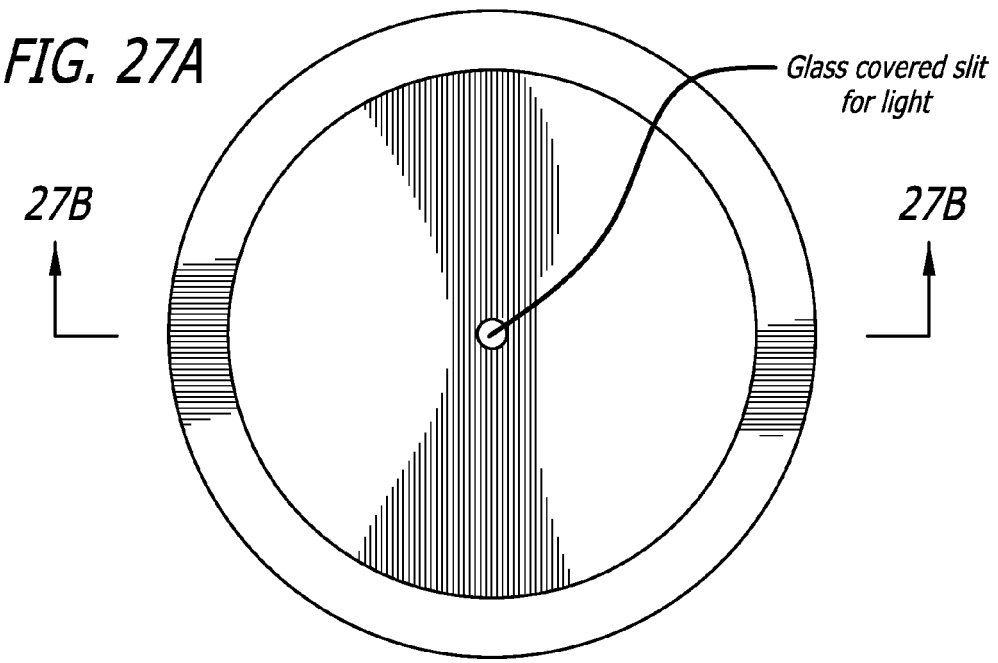
FIG. 27A illustrates a top view of a two light sensor that is embedded into an E-Chip with a slit on top surface of the both sides of the E-Chip covered with small glass for light.
Figure 27B:
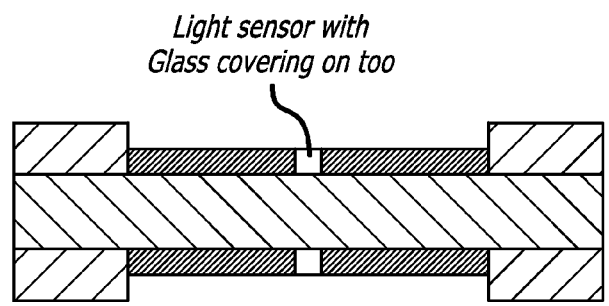
FIG. 27B illustrates a longitudinal view of a two light sensor that is embedded into an E-Chip with a slit on top surface of the both sides of the E-Chip covered with small glass for light.
Figure 28:
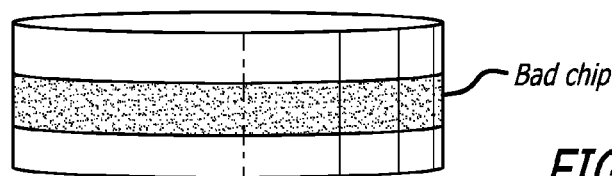
FIG. 28 illustrates longitudinal view of a bad E-Chip.

In still another embodiment of the E-chip capacitive coupling system and method, fake/bad E-chips may be identified using other approaches. One such alternative approach is a sensor based approach. Referring now to FIG. 27, in this approach a two light sensor is embedded into the E-Chip with a slit on the top and bottom surfaces of the E-Chip. The slits are covered with glass so that light may pass through the slits. This sensor is placed at the center of the E-Chip to avoid a false trigger due to the partial overlapping of other E-Chips. In this manner, the central chip tracker system is informed that a bad chip is detected on a particular chip stack at a particular position. Alternatively, chip may contain an error LED to indicate that the top E-Chip cannot be contacted.

Truth TABLE 1

| | Sensor Input (Side-A) | Sensor Input (Side-B) | Chip classification |
|---|---|---|---|
| 1 | Light received | No Light | Top chip |
| 2 | No Light | Light received | Top chip |
| 3 | No Light | No Light | Bottom Or Middle chip |
| 4 | Light received | Light received | Invalid case |

In one embodiment of the E-chip capacitive coupling system and method, the method of bad chip detection using sensor is explained the bad E-Chip is in the middle of the stack. In one embodiment, shown in FIG. 28, there are three E-chips: T(op), M(iddle), and B(ottom). The light slits in the B(ottom) E-chip are covered by the M(iddle) E-chip and the table. The light slits of M(iddle) E-chip are covered by M(iddle) and T(op) E-chip. One light slit of the T(op) E-chip is covered by the M(iddle) E-chip and the other light slit is open allowing light to pass through. Thus, only the T(op) E-chip in the stack is able to sense light. Refer truth table 1 stated above.

Continuing, the table transceiver sends a poll to the B(ottom) E-chip. Next, the B(ottom) E-chip sends an acknowledge message to table transceiver and forwards the poll to the M(iddle) E-chip. In this embodiment, the M(iddle) E-chip is a fake/bad E-chip, so it does not respond to the poll sent by the B(ottom) E-chip. The B(ottom) E-chip then checks its light sensor reading. Since both the slits are closed (i.e., the light is blocked by the M(iddle) E-chip and the table), the B(ottom) E-chip cannot sense light and, thus, the B(ottom) E-chip knows that it is not the T(op) E-chip. Since there no response from the chip above (i.e., the bad E-chip), the B(ottom) E-chip sends an error message to the table transceiver. The table transceiver in turn sends this message to table manager and central chip tracking system.

Figure 29:
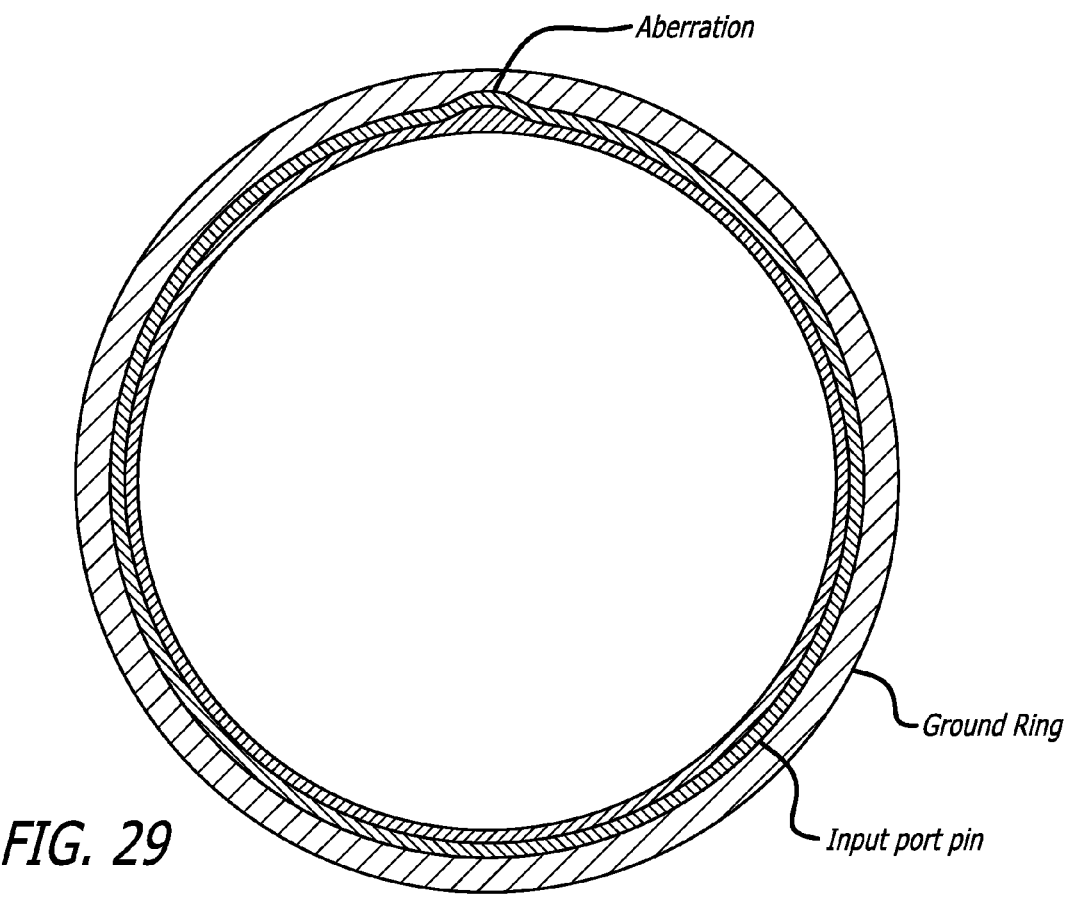
FIG. 29 illustrates an E-Chip with a small aberration introduced to ensure that the inner ring gets shorted to the outer ground ring when stacked E-Chips overlap perfectly.

In yet another embodiment of the E-chip capacitive coupling system and method, fake/bad E-chips may be identified using an input ring embodiment. In this embodiment, a flat thin conductive ring is circumscribed very near to the outer ground ring on both top and bottom side of E-Chip. As shown in FIG. 29, a small aberration is introduced to ensure inner ring is shorted to the outer ground ring when E-Chips overlap perfectly. The inner ring is connected to the input port of the microcontroller. Accordingly, it stays in a logic high state. When an E-Chip is placed on top surface, the outer ground ring touches the inner ring causing the input port pin to be shorted to the electrical ground. This transition is recognized by the E-Chip as identifying the presence of an E-Chip on the top surface.

In one embodiment, an E-Chip is characterized as "bad" when it does not respond to any communication request. The presence of a non-responsive E-Chip is identified by the E-Chip below it, and is reported to the table server.

Truth TABLE 2

| Input Port Pin state (Side-A) | Input Port Pin state (Side-B) | Chip classification |
|---|---|---|
| 1 High (Inner ring not shorted to ground ring) | Low (Inner ring shorted to ground Ring) | Top chip |
| 2 Low (Inner ring shorted to ground Ring) | High (Inner ring not shorted to ground ring) | Top chip |
| 3 Low (Inner ring shorted to ground Ring) | Low (Inner ring shorted to ground Ring) | Bottom Or Middle chip |
| 4 High (Inner ring not shorted to ground ring) | High (Inner ring not shorted to ground ring) | Invalid case |

In another embodiment of the E-chip capacitive coupling system and method, fake/bad E-chips may be identified using a sensor embodiment. In this embodiment, sensor is used to identify a fake/bad E-chip in the center of a stack. In one embodiment, shown in FIG. 28, there are three E-chips: the T(op) E-chip, the M(iddle) E-chip, and the B(ottom) E-chip. The B(ottom) E-chip has one side placed on table with transparent conductive polymer lines, and has the other side touching the M(iddle) E-chip, which is placed on top of the B(ottom) E-chip. Thus, both the input port pins are shorted to ground. The M(iddle) E-chip is placed between B(ottom) E-chip and T(op) E-chip. Accordingly, both of the input port pins are shorted to ground. The T(op) E-chip is placed above M(iddle) E-chip, and there is no E-chip on top of it. Thus, for T(op) E-chip only one side of the input port pins are shorted to ground and input port pin on the other side is open. Please see the Truth Table 2 above.

Continuing, the table transceiver sends a poll to the B(ottom) E-chip. The B(ottom) E-chip then sends an acknowledge message to table transceiver and forwards the poll to the M(iddle) E-chip. Since the M(iddle) E-chip is a fake/bad chip in this example, the M(iddle) E-chip does not respond to the poll sent by the B(ottom) E-chip. After a preset "time out" period is reached, the B(ottom) E-chip checks its input port pin reading. Since both of the input port pin are shorted to ground by the M(iddle) E-chip and the table, the B(ottom) E-chip input port pin cannot sense a logic high state. Accordingly, the B(ottom) E-chip knows that it is not the T(op) E-chip. Since there is no response from the chip above, B(ottom) E-chip sends error message to the table transceiver, which then sends this error message (confirming that the M(iddle) E-chip is a fake/bad chip) to table manager and central chip tracking system.

Using another aspect of the E-chip capacitive coupling system and method, the life of the battery for an E-chip may be determined. The microcontroller unit (MCU) will run as long as battery is alive. Battery life may be determined using the parameters of a 2% self-discharge per year; a capacity 100 mAh; 10% of the day, the chip is in betting area on the table, communicating with the table transceiver; and the CPU being active for 30 milliseconds per second. According to the above parameters, the life of the battery of the E-Chip is expected to be approximately 9.74 years.

Another aspect of the E-chip capacitive coupling system and method enables chip duplication prevention security measures for re-programmable chips. As the only way to duplicate an E-Chip is by transferring the codes from original chip to fake chip. To prevent chip from duplicating following methods can be employed: (1) using a blow JTAG (Joint Test Action Group) fuse, so that no reprogramming can take place; (2) employing a security password for Bootstrap Loader, such that if a wrong password is entered the code memory is erased; and (3) storing the E-Chip program in NV-RAM (Non Volatile RAM) rather than the traditional ROM or EPROM, which ensures that anyone trying to tamper with the chip, will result in complete loss of program data.

In other embodiments of the E-chip capacitive coupling system and method, E-Chip associates player with chip by storing the player ID in the E-Chip, as well as associating the player to chip in the casino systems. In one embodiment, the E-Chip performs processing such as calculating the total amount of money in a stack, thereby improving game speed for table games. In another aspect of one embodiment, the E-Chips enable inter chip communication (i.e., a first E-chip can communicate with other E-chips in the stack). In still another aspect of one embodiment, the E-Chip uses very near field capacitive coupling communication making the chip very insensitive to ambient interferences, thereby creating more reliable and faster communication. In yet another aspect of one embodiment, the E-Chip opens up future table innovation such as a fully automated casino table, which can pay back players based on game results (e.g., faster and better chip dispensers, sorters, and the like).

In still other aspects of the E-chip capacitive coupling system and method, E-chips improve inventory management by providing greater granularity of information, as well as faster inventory management. In another aspect of one embodiment, E-Chips provide player statistics at more granular form enabling improving player analysis. In still another aspect, E-Chips provide a high level of security since E-Chips are very difficult to duplicate E-Chip. Additionally, E-Chips are trackable. In still another aspect, E-Chips are able to detect any fraud or malpractice such as post betting, chip stealing, and the like, thereby improving the casino operations. For example, if the bet is changed during a game by removing or adding a chip, table system can indicate a place where chip stack value is changed.

Figure 30:
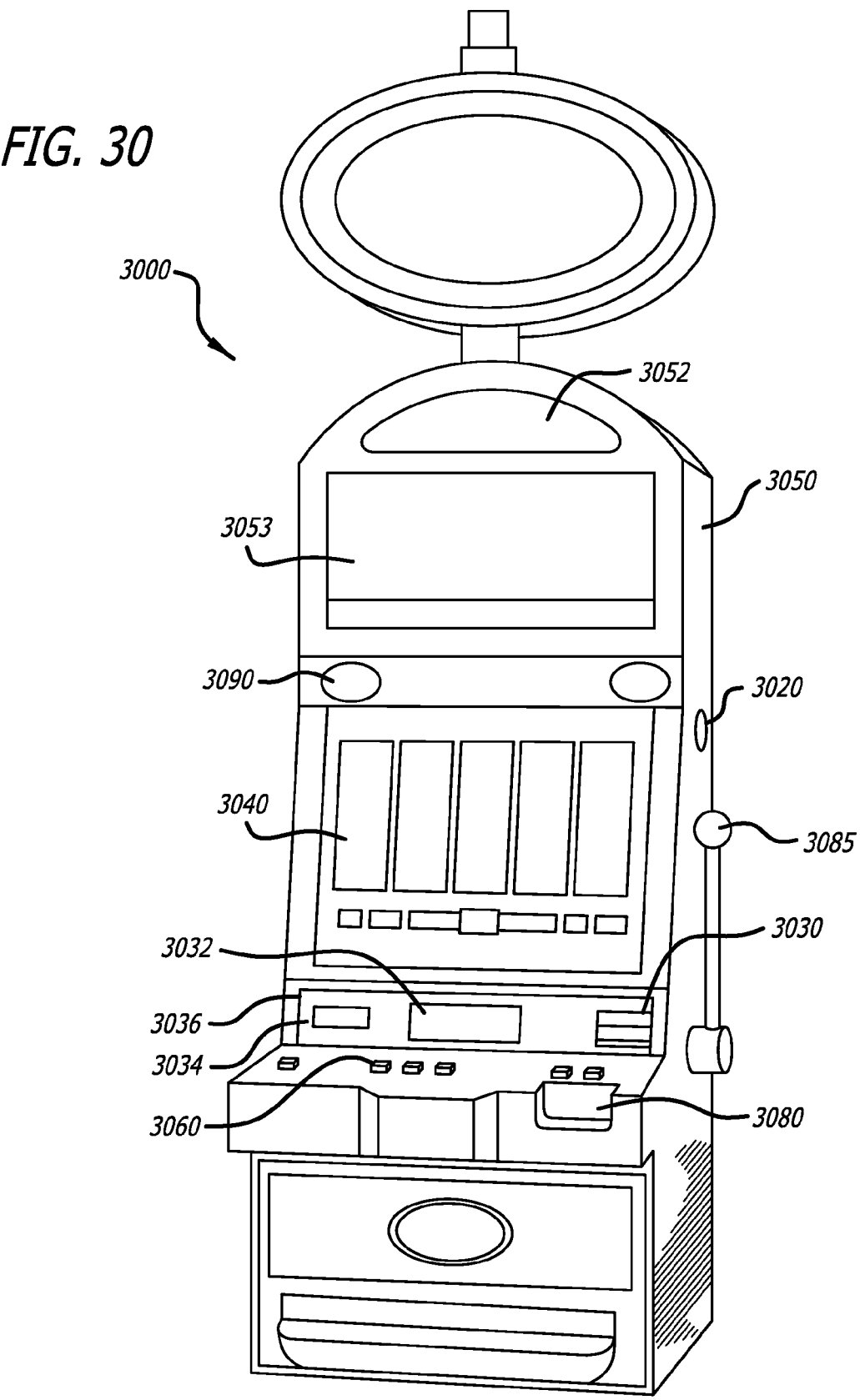
FIG. 30 illustrates a perspective view of a gaming machine in accordance with one or more embodiments.

Referring to FIG. 30, gaming machine 3000 is capable of supporting various, including cabinet housing 3020, primary game display 3040 upon which a primary game and feature game may be displayed, top box 3050 which may display multiple progressives that may be won during play of the feature game, player-activated buttons 3060, player tracking panel 3036, bill/voucher acceptor 3080 and one or more speakers 3090. Cabinet housing 3020 may be a self-standing unit that is generally rectangular in shape and may be manufactured with reinforced steel or other rigid materials which are resistant to tampering and vandalism. Cabinet housing 3020 may alternatively be a handheld device including the gaming functionality as discussed herein and including various of the described components herein. For example, a handheld device may be a cell phone, personal data assistant, or laptop or tablet computer, each of which may include a display, a processor, and memory sufficient to support either stand-alone capability such as gaming machine 3000 or thin client capability such as that incorporating some of the capability of a remote server.

In one or more embodiments, cabinet housing 3020 houses a processor, circuitry, and software (not shown) for receiving signals from the player-activated buttons 3060, operating the games, and transmitting signals to the respective displays and speakers. Any shaped cabinet may be implemented with any embodiment of gaming machine 3000 so long as it provides access to a player for playing a game. For example, cabinet 3020 may comprise a slant-top, bar-top, or table-top style cabinet, including a Bally Cinevision™ or CineReels™ cabinet. The operation of gaming machine 3000 is described more fully below.

The plurality of player-activated buttons 3060 may be used for various functions such as, but not limited to, selecting a wager denomination, selecting a game to be played, selecting a wager amount per game, initiating a game, or cashing out money from gaming machine 3000. Buttons 3060 may be operable as input mechanisms and may include mechanical buttons, electromechanical buttons or touch screen buttons. Optionally, a handle 3085 may be rotated by a player to initiate a game.

In one or more embodiments, buttons 3060 may be replaced with various other input mechanisms known in the art such as, but not limited to, a touch screen system, touch pad, track ball, mouse, switches, toggle switches, or other input means used to accept player input such as a Bally iDeck™. One other example input means is a universal button module as disclosed in U.S. Patent Publication No. 20060247047, entitled "Universal Button Module," filed on Apr. 14, 2005, which is hereby incorporated by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

Cabinet housing 3020 may optionally include top box 3050 which contains "top glass" 3052 comprising advertising or payout information related to the game or games available on gaming machine 3000. Player tracking panel 3036 includes player tracking card reader 3034 and player tracking display 3032. Voucher printer 3030 may be integrated into player tracking panel 3036 or installed elsewhere in cabinet housing 3020 or top box 3050.

Game display 3040 may present a game of chance wherein a player receives one or more outcomes from a set of potential outcomes. For example, one such game of chance is a video slot machine game. In other aspects of the invention, gaming machine 3000 may present a video or mechanical reel slot machine, a video keno game, a lottery game, a bingo game, a Class II bingo game, a roulette game, a craps game, a blackjack game, a mechanical or video representation of a wheel game or the like.

Mechanical or video/mechanical embodiments may include game displays such as mechanical reels, wheels, or dice as required to present the game to the player. In video/mechanical or pure video embodiments, game display 3040 is, typically, a CRT or a flat-panel display in the form of, but not limited to, liquid crystal, plasma, electroluminescent, vacuum fluorescent, field emission, or any other type of panel display known or developed in the art. Game display 3040 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. Additionally, game display 3040 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference in its entirety for all purposes.

Game display 3040 may also present information such as, but not limited to, player information, advertisements and casino promotions, graphic displays, news and sports updates, or even offer an alternate game. This information may be generated through a host computer networked with gaming machine 3000 on its own initiative or it may be obtained by request of the player using either one or more of the plurality of player-activated buttons 3060; the game display itself, if game display 3040 comprises a touch screen or similar technology; buttons (not shown) mounted about game display 3040 which may permit selections such as those found on an ATM machine, where legends on the screen are associated with respective selecting buttons; or any player input device that offers the required functionality.

Cabinet housing 3020 incorporates a single game display 3040. However, in alternate embodiments, cabinet housing 3020 or top box 3050 may house one or more additional displays 3053 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 31A:
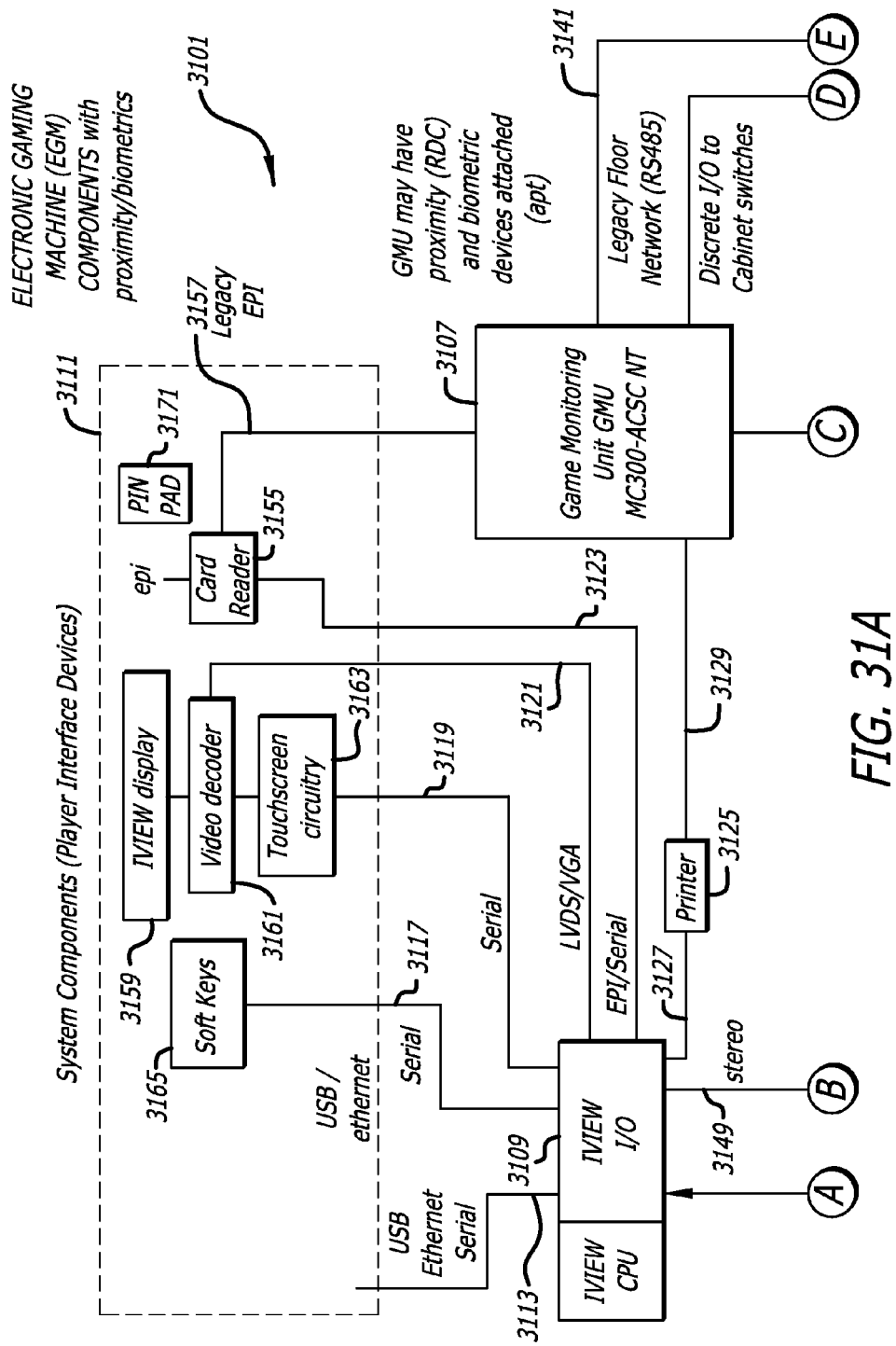
FIG. 31A illustrates a block diagram of the physical and logical components of the gaming machine of FIG. 1 in accordance with one or more embodiments.
Figure 31B:
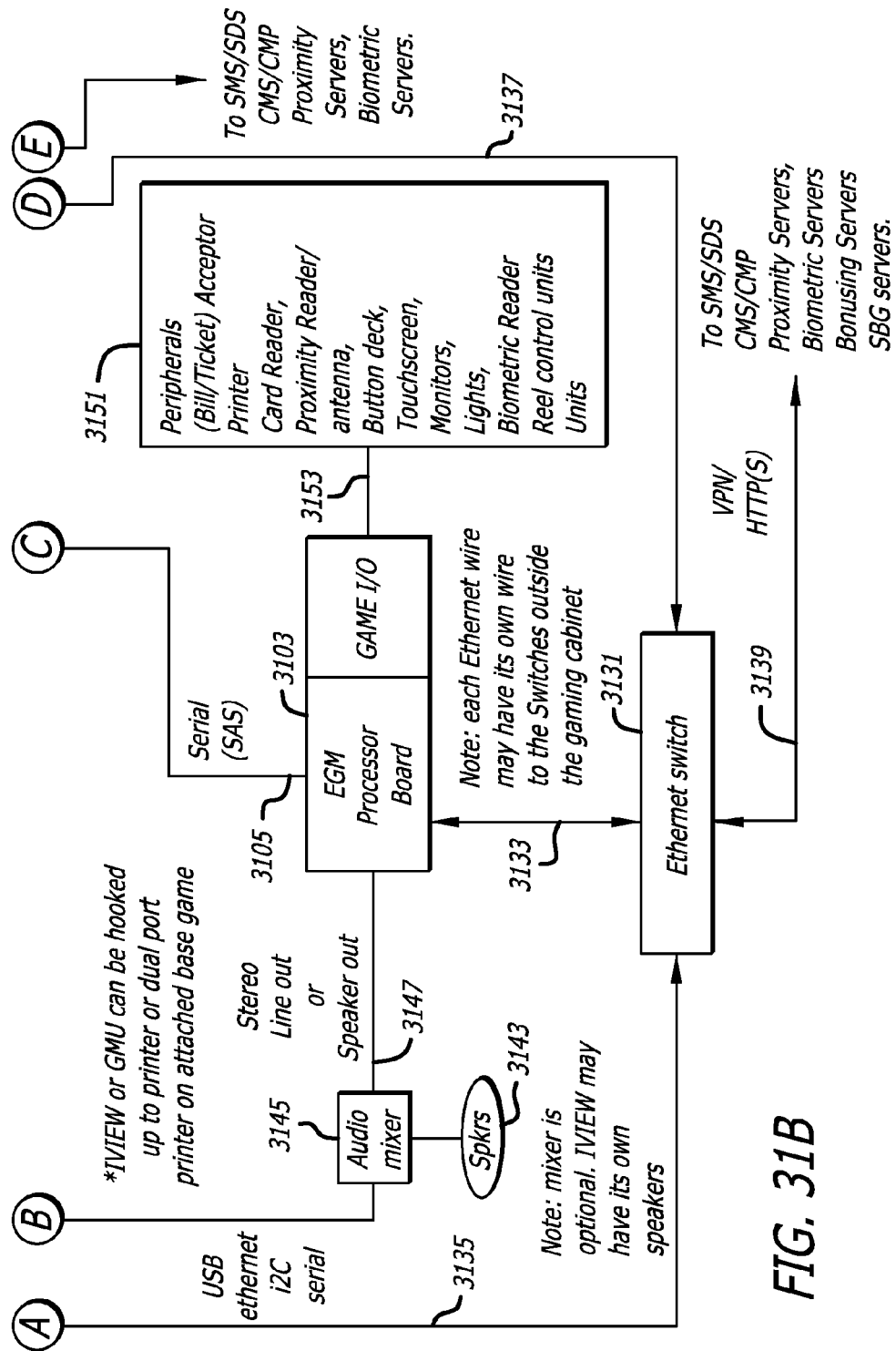
FIG. 31B illustrates a block diagram of the physical and logical components of the gaming machine of FIG. 1 in accordance with one or more embodiments.

Referring to FIGS. 31A and 31B, electronic gaming machine 3101 is shown in accordance with one or more embodiments. Electronic gaming machine 3101 includes base game integrated circuit board 3103 (EGM Processor Board) connected through serial bus line 3105 to game monitoring unit (GMU) 3107 (such as a Bally MC300 or ACSC NT), and player interface integrated circuit board (PIB) 3109 connected to player interface devices 3111 over bus lines 3113, 3115, 3117, 3119, 3121, 3123. Printer 3125 is connected to PIB 3109 and GMU 3107 over bus lines 3127, 3129. Base game integrated circuit board 3103, PIB 3109, and GMU 3107 connect to Ethernet switch 3131 over bus lines 3133, 3135, 3137. Ethernet switch 3131 connects to a slot management system (SMS) and a casino management system (CMS) network over bus line 3139. GMU 3107 also may connect to the SMS and CMS network over bus line 3141. Speakers 3143 connect through audio mixer 3145 and bus lines 3147, 3149 to base game integrated circuit board 3103 and PIB 3109. The proximity and biometric devices and circuitry may be installed by upgrading a commercially available PIB 3109, such as a Bally iView™ unit. Coding executed on base game integrated circuit board 3103, PIB 3109, and/or GMU 3107 may be upgraded to integrate a game in accordance with one or more embodiments of the invention described herein, as is more fully described below.

Peripherals 3151 connect through I/O board 3153 to base game integrated circuit board 3103. For example, a bill/ticket acceptor is typically connected to a game input-output board 3153 which is, in turn, connected to a conventional central processing unit ("CPU") base game integrated circuit board 3103, such as an Intel Pentium microprocessor mounted on a gaming motherboard. I/O board 3153 may be connected to base game integrated circuit board 3103 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Base game integrated circuit board 3103 executes a game program that causes base game integrated circuit board 3103 to play a game. In one embodiment, the game program provides a slot machine game having adjustable multi-part indicia. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 3153 to base game integrated circuit board 3103 which, in turn, assigns an appropriate number of credits for play in accordance with the game program. The player may further control the operation of the gaming machine by way of other peripherals 3151, for example, to select the amount to wager via electromechanical or touch screen buttons. The game starts in response to the player operating a start mechanism such as a handle or touch screen icon. The game program includes a random number generator to provide a display of randomly selected indicia on one or more displays. In some embodiments, the random generator may be physically separate from gaming machine 3100; for example, it may be part of a central determination host system which provides random game outcomes to the game program. Thereafter, the player may or may not interact with the game through electromechanical or touch screen buttons to change the displayed indicia. Finally, base game integrated circuit board 3103 under control of the game program and OS compares the final display of indicia to a pay table. The set of possible game outcomes may include a subset of outcomes related to the triggering of a feature game. In the event the displayed outcome is a member of this subset, base game integrated circuit board 3103, under control of the game program and by way of I/O Board 3153, may cause feature game play to be presented on a feature display.

Predetermined payout amounts for certain outcomes, including feature game outcomes, are stored as part of the game program. Such payout amounts are, in response to instructions from base game integrated circuit board 3103, provided to the player in the form of coins, credits or currency via I/O board 3153 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 3107 includes an integrated circuit board and GMU processor and memory including coding for network communications, such as the G2S (game-to-system) protocol from the Gaming Standards Association, Las Vegas, Nev., used for system communications over the network. As shown, GMU 3107 may connect to card reader 3155 through bus 3157 and may thereby obtain player card information and transmit the information over the network through bus 3141. Gaming activity information may be transferred by the base game integrated circuit board 3103 to GMU 3107 where the information may be translated into a network protocol, such as S2S, for transmission to a server, such as a player tracking server, where information about a player's playing activity may be stored in a designated server database.

PIB 3109 includes an integrated circuit board, PID processor, and memory which includes an operating system, such as Windows CE, a player interface program which may be executable by the PID processor together with various input/output (I/O) drivers for respective devices which connect to PIB 3109, such as player interface devices 3111, and which may further include various games or game components playable on PIB 3109 or playable on a connected network server and PIB 3109 is operable as the player interface. PIB 3109 connects to card reader 3155 through bus 3123, display 3159 through video decoder 3161 and bus 3121, such as an LVDS or VGA bus.

As part of its programming, the PID processor executes coding to drive display 3159 and provide messages and information to a player. Touch screen circuitry interactively connects display 3159 and video decoder 3161 to PIB 3109, such that a player may input information and cause the information to be transmitted to PIB 3109 either on the player's initiative or responsive to a query by PIB 3109. Additionally soft keys 3165 connect through bus 3117 to PIB 3109 and operate together with display 3159 to provide information or queries to a player and receive responses or queries from the player. PIB 3109, in turn, communicates over the CMS/SMS network through Ethernet switch 3131 and busses 3135, 3139 and with respective servers, such as a player tracking server.

Player interface devices 3111 are linked into the virtual private network of the system components in gaming machine 3101. The system components include the iView processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the iView™ processing board and game monitoring unit (GMU) processing board. The GMU and iView™ can be combined into one like the commercially available Bally G™ iView device. This device may have a video mixing technology to mix the EGM processor's video signals with the iView display onto the top box monitor or any monitor on the gaming device.

Figure 32:
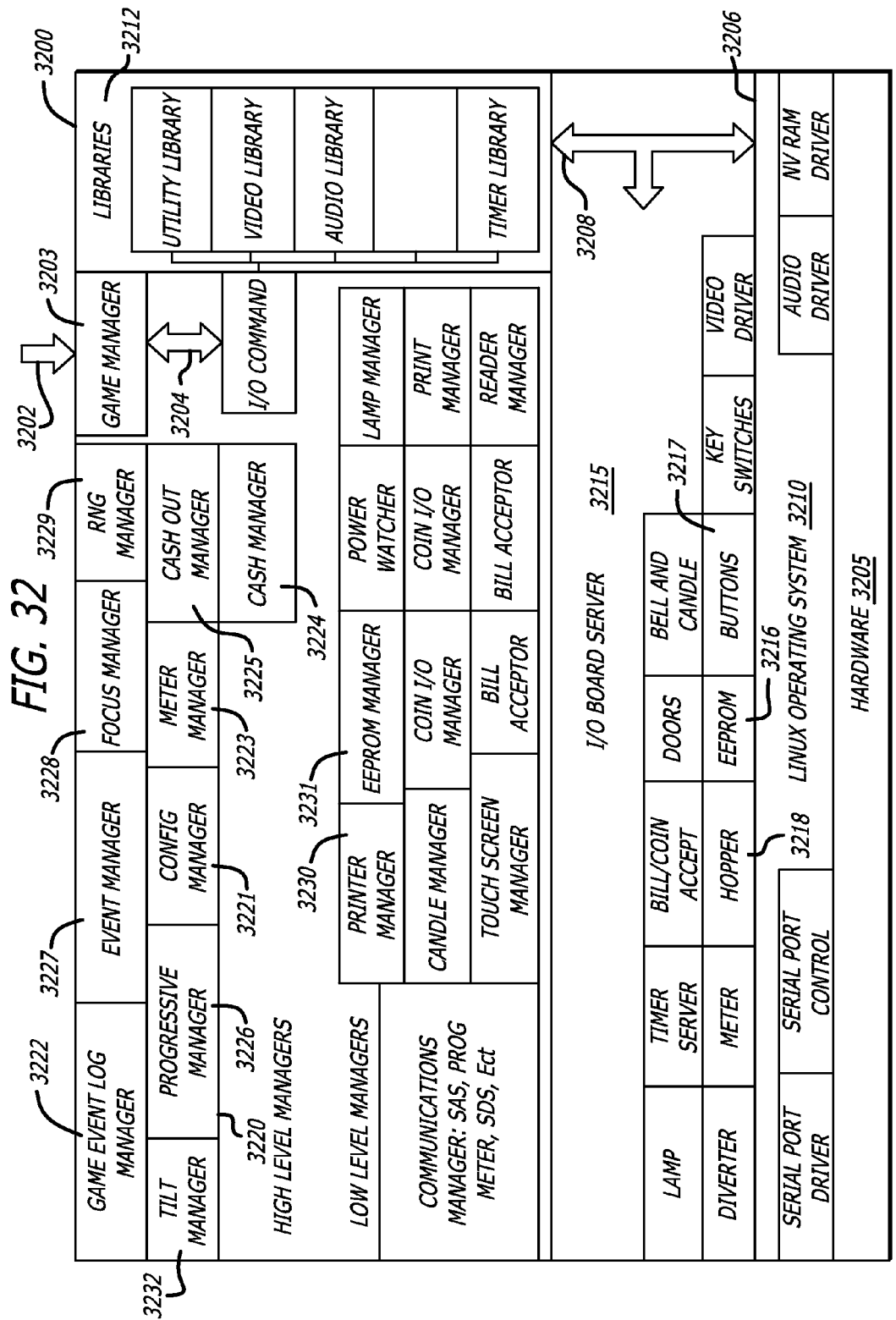
FIG. 32 illustrates a block diagram of the logical components of a gaming kernel in accordance with one or more embodiments.

In accordance with one or more embodiments, FIG. 32 is a functional block diagram of a gaming kernel 3200 of a game program under control of base game integrated circuit board 3203. The game program uses gaming kernel 3200 by calling into application programming interface (API) 3202, which is part of game manager 3203. The components of game kernel 3200 as shown in FIG. 32 are only illustrative, and should not be considered limiting. For example, the number of managers may be changed, additional managers may be added or some managers may be removed without deviating from the scope and spirit of the invention.

As shown in the example, there are three layers: a hardware layer 3205; an operating system layer 3210, such as, but not limited to, Linux; and a game kernel layer 3200 having game manager 3203 therein. In one or more embodiments, the use of a standard operating system 3210, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 3200 executes at the user level of the operating system 3210, and itself contains a major component called the I/O Board Server 3215. To properly set the bounds of game application software (making integrity checking easier), all game applications interact with gaming kernel 3200 using a single API 3202 in game manager 3203. This enables game applications to make use of a well-defined, consistent interface, as well as making access points to gaming kernel 3200 controlled, where overall access is controlled using separate processes.

For example, game manager 3203 parses an incoming command stream and, when a command dealing with I/O comes in (arrow 3204), the command is sent to an applicable library routine 3212. Library routine 3212 decides what it needs from a device, and sends commands to I/O Board Server 3215 (see arrow 3208). A few specific drivers remain in operating system 3210's kernel, shown as those below line 3206. These are built-in, primitive, or privileged drivers that are (i) general (ii) kept to a minimum and (iii) are easier to leave than extract. In such cases, the low-level communications is handled within operating system 3210 and the contents passed to library routines 3212.

Thus, in a few cases library routines may interact with drivers inside operating system 3210, which is why arrow 3208 is shown as having three directions (between library utilities 3212 and I/O Board Server 3215, or between library utilities 3212 and certain drivers in operating system 3210). No matter which path is taken, the logic needed to work with each device is coded into modules in the user layer of the diagram. Operating system 3210 is kept as simple, stripped down, and common across as many hardware platforms as possible. The library utilities and user-level drivers change as dictated by the game cabinet or game machine in which it will run. Thus, each game cabinet or game machine may have an base game integrated circuit board 3203 connected to a unique, relatively dumb, and as inexpensive as possible I/O adapter board 3240, plus a gaming kernel 3200 which will have the game-machine-unique library routines and I/O Board Server 3215 components needed to enable game applications to interact with the gaming machine cabinet. Note that these differences are invisible to the game application software with the exception of certain functional differences (i.e., if a gaming cabinet has stereo sound, the game application will be able make use of API 3202 to use the capability over that of a cabinet having traditional monaural sound).

Game manager 3203 provides an interface into game kernel 3200, providing consistent, predictable, and backwards compatible calling methods, syntax, and capabilities by way of game application API 3202. This enables the game developer to be free of dealing directly with the hardware, including the freedom to not have to deal with low-level drivers as well as the freedom to not have to program lower level managers 3230, although lower level managers 3230 may be accessible through game manager 3203's interface 3202 if a programmer has the need. In addition to the freedom derived from not having to deal with the hardware level drivers and the freedom of having consistent, callable, object-oriented interfaces to software managers of those components (drivers), game manager 3203 provides access to a set of upper level managers 3220 also having the advantages of consistent callable, object-oriented interfaces, and further providing the types and kinds of base functionality required in casino-type games. Game manager 3203, providing all the advantages of its consistent and richly functional interface 3202 as supported by the rest of game kernel 3200, thus provides a game developer with a multitude of advantages.

Game manager 3203 may have several objects within itself, including an initialization object (not shown). The initialization object performs the initialization of the entire game machine, including other objects, after game manager 3203 has started its internal objects and servers in appropriate order. In order to carry out this function, the kernel's configuration manager 3221 is among the first objects to be started; configuration manager 3221 has data needed to initialize and correctly configure other objects or servers.

The upper level managers 3220 of game kernel 3200 may include game event log manager 3222 which provides, at the least, a logging or logger base class, enabling other logging objects to be derived from this base object. The logger object is a generic logger; that is, it is not aware of the contents of logged messages and events. The log manager's (3222) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 3223 manages the various meters embodied in the game kernel 3200. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 3223 receives its initialization data for the meters, during start-up, from configuration manager 3221. While running, the cash in (3224) and cash out (3225) managers call the meter manager's (3223) update functions to update the meters. Meter manager 3223 will, on occasion, create backup copies of the soft meters by storing the soft meters' readings in EEPROM. This is accomplished by calling and using EEPROM manager 3231.

In accordance with still other embodiments, progressive manager 3226 manages progressive games playable from the game machine. Event manager 3227 is generic, like log manager 3222, and is used to manage various gaming machine events. Focus manager 3228 correlates which process has control of various focus items. Tilt manager 3232 is an object that receives a list of errors (if any) from configuration manager 3221 at initialization, and during game play from processes, managers, drivers, etc. that may generate errors. Random number generator manager 3229 is provided to allow easy programming access to a random number generator (RNG), as a RNG is required in virtually all casino-style (gambling) games. RNG manager 3229 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 3225 has the responsibility of configuring and managing monetary output devices. During initialization, cash out manager 3225, using data from configuration manager 3221, sets the cash out devices correctly and selects any selectable cash out denominations. During play, a game application may post a cash out event through the event manager 3227 (the same way all events are handled), and using a call-back posted by cash out manager 3225, cash out manager 3225 is informed of the event. Cash out manager 3225 updates the credit object, updates its state in non-volatile memory, and sends an appropriate control message to the device manager that corresponds to the dispensing device. As the device dispenses dispensable media, there will typically be event messages being sent back and forth between the device and cash out manager 3225 until the dispensing finishes, after which cash out manager 3225, having updated the credit manager and any other game state (such as some associated with meter manager 3223) that needs to be updated for this set of actions, sends a cash out completion event to event manager 3227 and to the game application thereby. Cash in manager 3224 functions similarly to cash out manager 3225, only controlling, interfacing with, and taking care of actions associated with cashing in events, cash in devices, and associated meters and crediting.

In a further example, in accordance with one or more embodiments, I/O server 3215 may write data to the gaming machine EEPROM memory, which is located in the gaming machine cabinet and holds meter storage that must be kept even in the event of power failure. Game manager 3203 calls the I/O library functions to write data to the EEPROM. The I/O server 3215 receives the request and starts a low priority EEPROM thread 3216 within I/O server 3215 to write the data. This thread uses a sequence of 8 bit command and data writes to the EEPROM device to write the appropriate data in the proper location within the device. Any errors detected will be sent as IPC messages to game manager 3203. All of this processing is asynchronous.

In accordance with one embodiment, button module 3217 within I/O server 3215, polls (or is sent) the state of buttons every 2 ms. These inputs are debounced by keeping a history of input samples. Certain sequences of samples are required to detect a button was pressed, in which case the I/O server 3215 sends an inter-process communication event to game manager 3203 that a button was pressed or released. In some embodiments, the gaming machine may have intelligent distributed I/O which debounces the buttons, in which case button module 3217 may be able to communicate with the remote intelligent button processor to get the button events and simply relay them to game manager 3203 via IPC messages. In still another embodiment, the I/O library may be used for pay out requests from the game application. For example, hopper module 3218 must start the hopper motor, constantly monitor the coin sensing lines of the hopper, debounce them, and send an IPC message to the game manager 3203 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 33A:
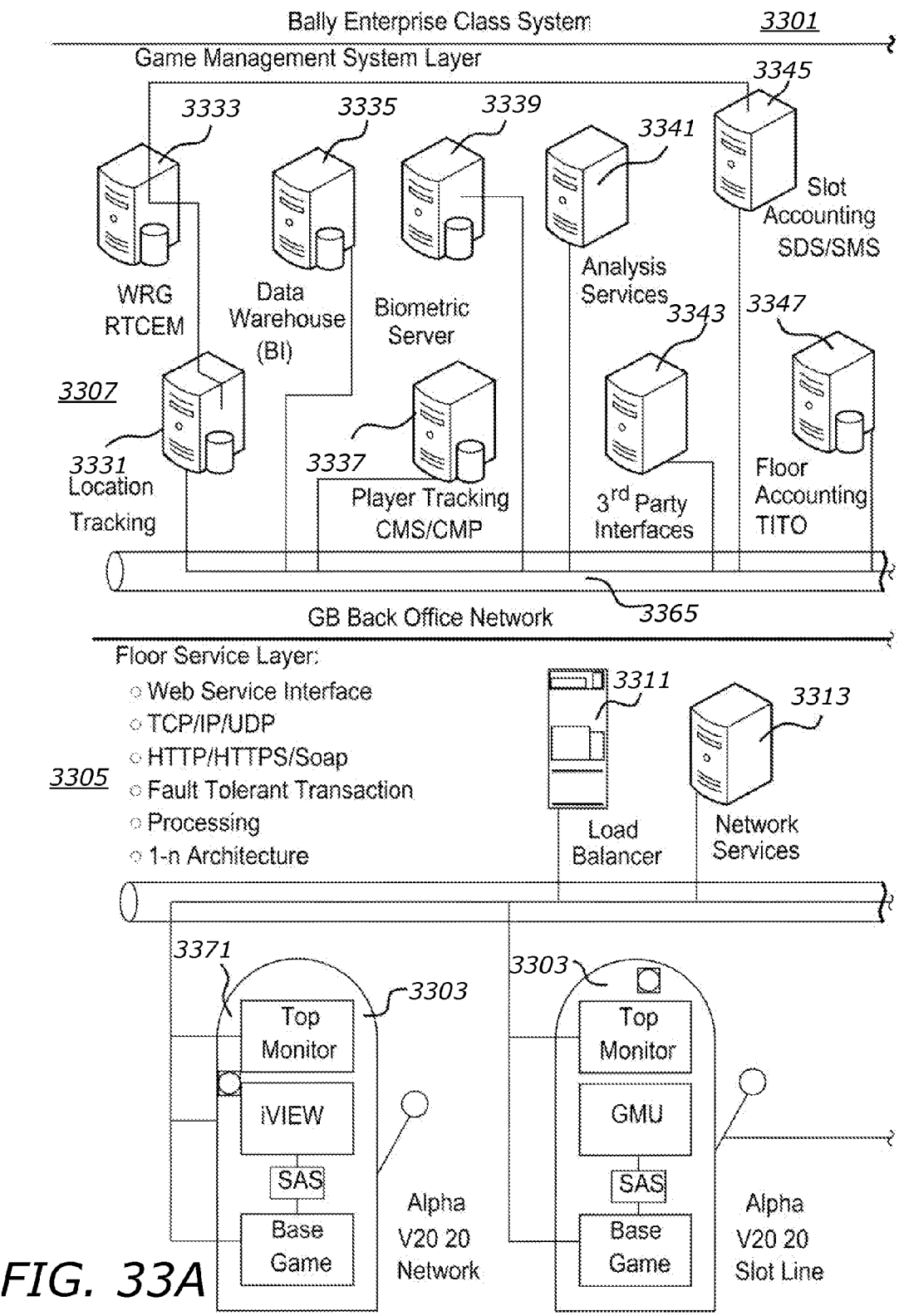
FIG. 33A illustrates a schematic block diagram showing the hardware elements of a networked gaming system in accordance with one or more embodiments.
Figure 33B:
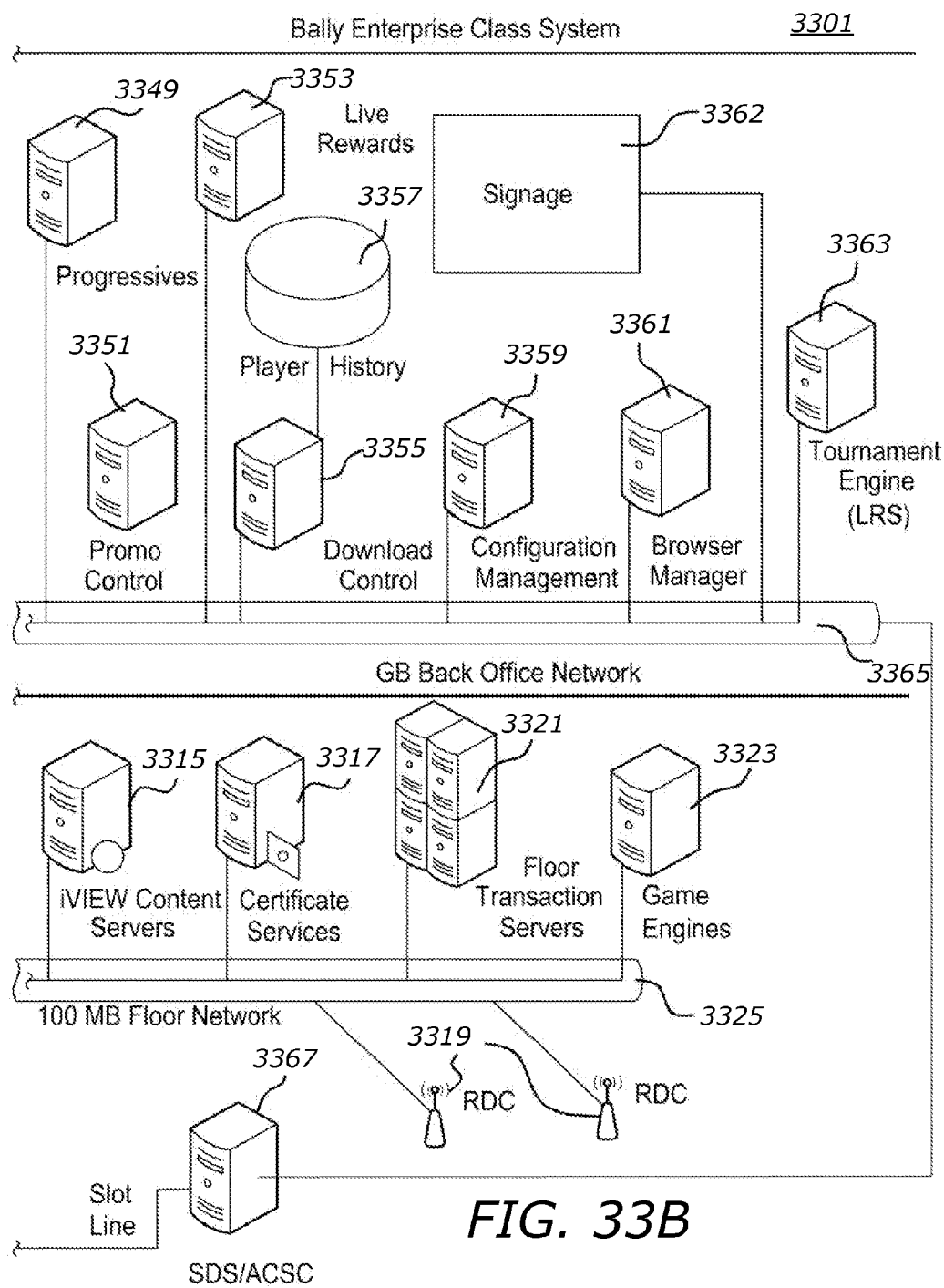
FIG. 33B illustrates a schematic block diagram showing the hardware elements of a networked gaming system in accordance with one or more embodiments.

Referring to FIGS. 33A and 33B, enterprise gaming system 3301 is shown in accordance with one or more embodiments. Enterprise gaming system 3301 may include one casino or multiple locations and generally includes a network of gaming machines 3303, floor management system (SMS) 3305, and casino management system (CMS) 3307. SMS 3305 may include load balancer 3311, network services servers 3313, player interface (iView) content servers 3315, certificate services server 3317, floor radio dispatch receiver/transmitters (RDC) 3319, floor transaction servers 3321 and game engines 3323, each of which may connect over network bus 3325 to gaming machines 3303. CMS 3307 may include location tracking server 3331, WRG RTCEM server 3333, data warehouse server 3335, player tracking server 3337, biometric server 3339, analysis services server 3341, third party interface server 3343, slot accounting server 3345, floor accounting server 3347, progressives server 3349, promo control server 3351, feature game (such as Bally Live Rewards) server 3353, download control server 3355, player history database 3357, configuration management server 3359, browser manager 3391, tournament engine server 3363 connecting through bus 3365 to server host 3367 and gaming machines 3303. The various servers and gaming machines 3303 may connect to the network with various conventional network connections (such as, for example, USB, serial, parallel, RS485, Ethernet). Additional servers which may be incorporated with CMS 3307 include a responsible gaming limit server (not shown), advertisement server (not shown), and a control station server (not shown) where an operator or authorized personnel may select options and input new programming to adjust each of the respective servers and gaming machines 3303. SMS 3305 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

Gaming machines 3303 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 3307 and/or SMS 3305 servers and devices, firmware, media, operating systems, and configurations may be downloaded to the system components of respective gaming machines for upgrading or managing floor content and offerings in accordance with operator selections or automatically depending upon CMS 3307 and SMS 3305 master programming. The data and programming updates to gaming machines 3303 are authenticated using conventional techniques prior to install on the system components.

In various embodiments, any of the gaming machines 3303 may be a mechanical reel spinning slot machine or a video slot machine or a gaming machine offering one or more of the above described games including a group play game. Alternately, gaming machines 3303 may provide a game with a simulated musical instrument interface as a primary or base game or as one of a set of multiple primary games selected for play by a random number generator. A gaming system of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. Patent Publication No. 20080139305, entitled "Networked System and Method for Group Play Gaming," filed on Nov. 9, 2007, which is hereby incorporated by reference in its entirety for all purposes.

Figure 34:
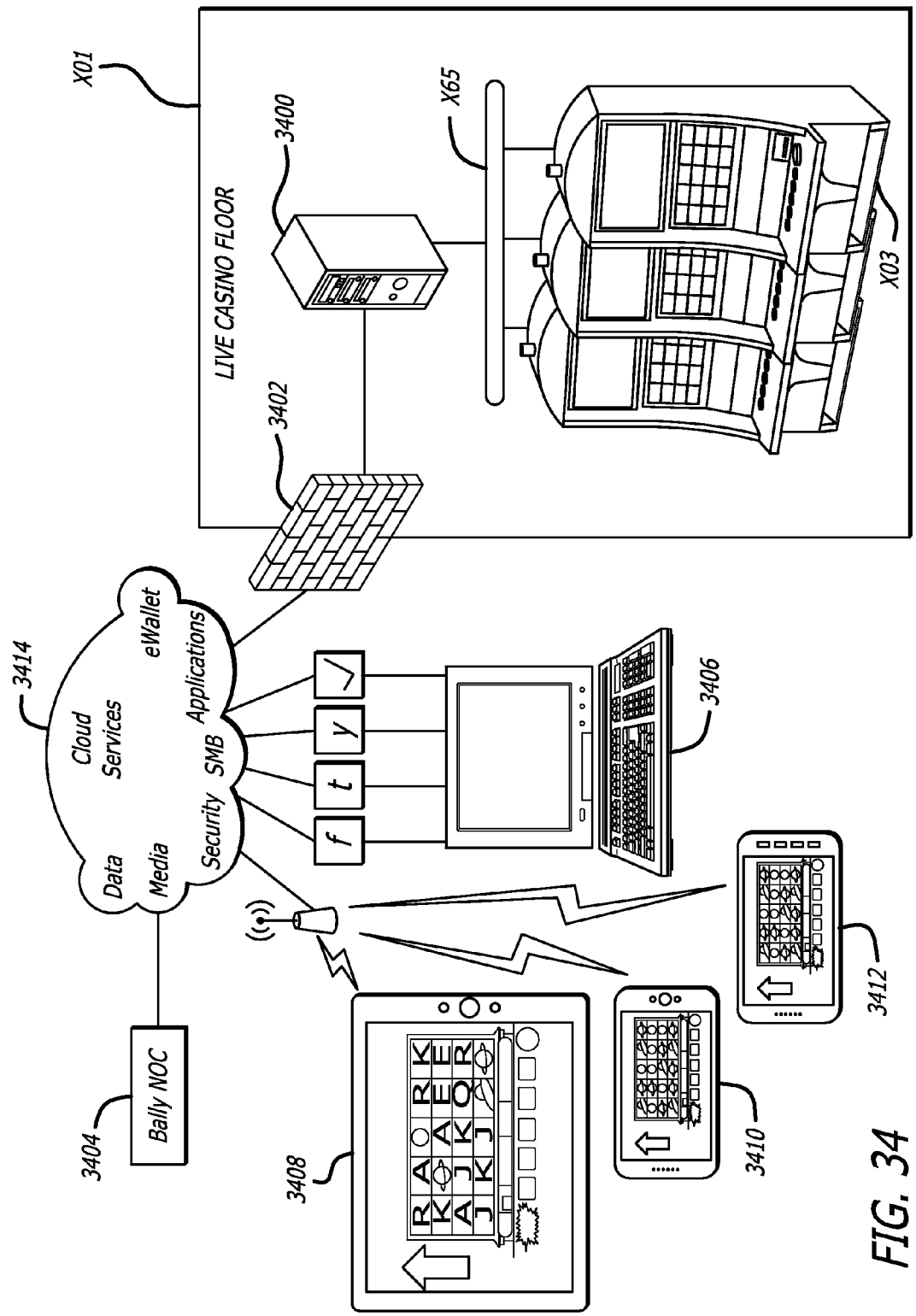
FIG. 34 illustrates a diagram showing an example of architecture for tying a casino enterprise network to an external provider of games and content to Internet or broadband communication capable devices.

All or portions of the present invention may also be implemented or promoted by or through a system as suggested in FIG. 34. At 3301 is the gaming system of FIGS. 33A and 33B, which may be hosted at a casino property enterprise, across several casino enterprises or by a third party host. As described above, the gaming system 3301 has a network communication bus 3365 providing for communication between the gaming terminals 3303 and various servers. To provide the functionality illustrated in FIG. 34, a bonusing server 3400, such as a Bally Elite Bonusing Server is connected to the network communication bus 3365 (FIGS. 33A and 33B) for communication to the gaming system 3301, the gaming terminals 3303 and the various servers and other devices as described above. Through a secure network firewall 3402 the bonusing server 3400 is in communication with a cloud computing/storage service 3404 which may be hosted by the casino enterprise, a licensed third party or if permitted by gaming regulators an unlicensed provider. For example the cloud service 3404 may be as provided by Microsoft® Private Cloud Solutions offered by Microsoft Corp. of Redmond, Wash., USA. The cloud service 3404 provides various applications which can be accessed and delivered to, for example, personal computers 3406, portable computing devices such as computer tablets 3408, personal digital assistants (PDAs) 3410 and cellular devices 3412 such as telephones and smart phones. As but an example, the cloud service 3404 may store and host an eWallet application, casino or player-centric applications such as downloadable or accessible applications including games, promotional material or applications directed to and/or affecting a casino customers interaction with a casino enterprise (such as accessing the players casino account, establishing casino credit or the like), providing bonuses to players through system wide bonusing (SMB) or specific bonusing or comps to players, or other applications. The cloud service 3404 includes security provide for secure communication with the cloud service 3404 between the player/users and the cloud service 3404 and between the cloud service 3404 and the gaming system 3301. Security applications may be through encryption, the use of personal identification numbers (PINS) or other devices and systems. As suggested in FIG. 34, the cloud service 3414 stores player/user data retrieved from players/users and from the gaming system 3301.

The players/users may access the cloud service 3404 and the applications and data provided thereby through the Internet or through broadband wireless cellular communication systems and any intervening sort range wireless communication such as WiFi. The players/users may access the applications and data through various social media offerings such as Facebook, Twitter, Yelp, MySpace, LinkedIn or the like.

As but an example, a player/user may have a player account with a casino enterprise Z. That account may include data such as the player's credit level, their rating and their available comps. The account may further track any certificates, and the present value thereof, the player may have won as a result of the playing a game according to the present invention. At their smart phone 3412 the player/user sends a request to the clout service 3404 (perhaps through a previously downloaded application) to request the status of their available comps such as how many comp points they have and what may be available through redemption of those points (e.g. lodging, cash back, meals or merchandise). The application for the request may present casino promotions, graphics or other advertising to the player/user. The application, to support such a request, would typically require the player/user to enter a PIN. The cloud service 3404 forwards the inquiry to the bonusing servicer 3400 which, in turn, confirms the PIN and retrieves the requested information from the data warehouse 3335 (FIGS. 33A & 33B) or player tracking CMS/CMP server 3337 (FIGS. 33A & 33B). Alternatively the data may be stored in the cloud service 3404 and routinely updated from the data warehouse 3335 or player tracking CMS/CMP server 3337. In this instance the request would be responded to from data residing with the cloud service 3404. The information is formatted by the cloud server 3404 application and delivered to the player/user. The delivery may be formatted based upon the player/user's device operating system (OS), display size or the like.

The cloud service 3400 may also host game applications to provide virtual instances of games for free, promotional, or where permitted, P2P (Pay to Play) supported gaming. Third party developers may also have access to placing applications with the cloud service 3404 through, for example a national operations center (Bally NOC 3414). A game software manufacturer such as Bally Gaming, Inc. may also provide game applications on its own or on behalf of the casino enterprise.

Other media such as advertising, notices (such as an upcoming tournament) may also be provided to the cloud service 3404. When a player/user accesses the cloud service 3404 certain media may be delivered to the player/user in a manner formatted for their application and device.

While the embodiment described relates to a Baccarat game it should be understood that the inventive concept could be applied to other games particularly those where inter-play player decisions are not required. For example, a slot machine, either electro-mechanical or video may operate one or more virtual games in the background and routinely report an outcome history to the player playing the primary, displayed, version of the game. The player may then compare the histories to the primary game and choose to instead play one of the one or more virtual background versions of the game. Each game version may operate from a differently seeded random number generator so the results (and histories may differ).

Still further the histories displays may be displayed at a window to either side, above or below the primary game version being wagered upon and played by the player or in a scrolling, ticker display again above or below or to either side of the primary game display. In such a fashion the player may view the histories and select a version of the game which the player may feel is "hotter" and is having better outcomes.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

While various embodiments have been described above, it should be understood that they have been presented by way of example only, and not limitation. Thus, the breadth and scope of a disclosed embodiment should not be limited by any of the above-described exemplary embodiments, but should be defined only in accordance with the following claims and their equivalents.

What is claimed:

1. A system for identifying and reading gaming tokens, the system comprising:
   a plurality of gaming tokens, each gaming token comprising:
      a substrate having first and second faces and a perimeter;
      a circuit including a power source, a token processor, and a token memory disposed in the substrate, the memory configured to store data that identifies at least a denomination of the gaming token;
      first and second conductive layers disposed on the first and second faces respectively, and
      a conductive rim at the perimeter;
   a playing surface including a network of conductors disposed to make electrical contact with the conductive rims of a subset of the gaming tokens that rest thereon and ground the circuits of the subset of gaming tokens to energize the token processors of the subset of gaming tokens with their respective power sources;
   one or more transceivers disposed under the playing surface and associated with areas where the gaming tokens are placed on the playing surface, each transceiver configured to transmit an electromagnetic interrogation signal to the first or second conductive layers of the subset of gaming tokens resting on the playing surface, each grounded circuit of the subset of gaming tokens in response to the interrogation signal responding with first data to identify the denomination of the gaming token through capacitive coupling between the first or second conductive layer and at least one transceiver of the one or more transceivers; and
   an identification processor in communication with the at least one transceiver to determine the denomination of the gaming token from the first data.

2. The system of claim 1, wherein the token memory of each gaming token is further configured to store second data including token identification data, and wherein the circuit of each of the subset of gaming tokens is configured to respond to the interrogation signal with the first and second data for the identification processor to identify the gaming token and its denomination.

3. The system of claim 1, wherein a first gaming token and a second gaming token of the subset of gaming tokens are stacked on the playing surface, wherein the first gaming token is a bottom gaming token and the second gaming token is a top gaming token.

4. The system of claim 3, wherein the transceiver interrogation signal received by the bottom gaming token is passed to the top gaming token through capacitive coupling between the first conductive layer of the bottom gaming token and the second conductive layer of top gaming token to the circuit of the top gaming token.

5. The system of claim 4, wherein a response of the circuit in the top gaming token is returned to the circuit of the bottom gaming token and to the at least one transceiver through capacitive coupling.

6. The system of claim 1, wherein the subset of gaming tokens includes N1-Nx gaming tokens that are stacked in a gaming token stack on the playing surface with N1 being a bottom gaming token and Nx being a top gaming token.

7. The system of claim 6, wherein the gaming token processors for gaming tokens N1-Nx serially pass the interrogation signal up the gaming token stack and serially pass responsive signals down the gaming token stack by capacitive coupling to the at least one transceiver for identification of at least a denomination of the gaming tokens in the gaming token stack.

8. A system for identifying and reading gaming tokens, the system comprising:
   a plurality of gaming tokens, each gaming token comprising:
      a body having a first face, a second face, and a perimeter with a conductive rim;
      a circuit including a power source, a token processor, and a token memory disposed in the body, the memory configured to store first data that identifies at least a denomination of the gaming token, and
      first and second conductive layers disposed on the first and second faces, respectively;
   one or more transceivers disposed under a playing surface having a network of conductors disposed to make electrical contact with the conductive rims of a subset of the gaming tokens that rest thereon to ground the circuits of the subset of gaming tokens to energize the token processors of the subset of gaming tokens with their respective power sources, and associated with areas where gaming tokens are placed on the playing surface, each transceiver configured to transmit an electromagnetic interrogation signal to the first or second conductive layers of the subset of gaming tokens resting on the playing surface, each grounded circuit of the subset of gaming tokens in response to the interrogation signal responding with first data to identify the denomination of the gaming token through capacitive coupling between the first or second conductive layer and at least one transceiver of the one or more transceivers; and
   an identification processor in communication with the at least one transceiver to determine from the first data the denomination of the gaming token.

9. The system of claim 8, wherein the token memory of each gaming token is further configured to store second data including token identification data, and wherein the circuit of each of the subset of gaming tokens is configured to respond to the interrogation signal with first and second data for the identification processor to identify the gaming token and its denomination.

10. The system of claim 8, wherein a first gaming token and a second gaming token of the subset of gaming tokens are stacked on the playing surface, wherein the first gaming token is a bottom gaming token and the second gaming token is a top gaming token.

11. The system of claim 10, wherein the transceiver interrogation signal received by the bottom gaming token is passed to the top gaming token through capacitive coupling between the first conductive layer of the bottom gaming token and the second conductive layer of top gaming token to the circuit of the top gaming token.

12. The system of claim 11, wherein a response of the circuit in the top gaming token is returned to the circuit of the bottom gaming token and to the at least one transceiver through capacitive coupling.

13. The system of claim 1, wherein the subset of gaming tokens includes N1-Nx gaming tokens that are stacked in a gaming token stake on the playing surface with N1 being a bottom gaming token and Nx being a top gaming token.

14. The system of claim 13, wherein the gaming token processors for gaming tokens N1-Nx serially pass the interrogation signal up the gaming token stack and serially pass responsive signals down the gaming token stack by capacitive coupling to the at least one transceiver for identification of at least a denomination of the gaming tokens in the gaming token stack.

15. A method for identifying and reading gaming tokens used by a player for the play of a game on a playing surface, the method comprising:

providing a plurality of gaming tokens, each gaming token comprising: (i) a substrate having a first face, a second face, and a perimeter; (ii) a circuit including a power source, a token processor, and a token memory disposed in the substrate, the token memory configured to store data that identifies at least a denomination of the gaming token, (iii) first and second conductive layers disposed on the first and second faces, respectively, and (v) a conductive rim at the perimeter;

configuring the playing surface to include a network of conductors disposed to make electrical contact with the conductive rims of a subset of the gaming tokens that rest thereon and ground the circuits of the subset of gaming tokens to energize the token processors of the subset of gaming tokens with their respective power sources;

equipping the playing surface with one or more transceivers disposed under the playing surface and associated with areas where the gaming tokens are placed on the playing surface, each transceiver configured to transmit an electromagnetic interrogation signal to first or second conductive layers of the subset of gaming tokens resting on the playing surface, wherein each grounded circuit, in response to the interrogation signal, responds with first data to identify the denomination of the gaming token through capacitive coupling between the first or second conductive layer and at least one transceiver of the one or more transceivers; and configuring an identification processor, in communication with the at least one transceiver, to determine the denomination of the gaming token from the first data.

* * * * *